(12) United States Patent
Tonegawa

(10) Patent No.: US 7,702,734 B2
(45) Date of Patent: Apr. 20, 2010

(54) E-MAIL COMMUNICATION APPARATUS AND DATA PROCESSING METHOD AND PROGRAM

(75) Inventor: Nobuyuki Tonegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 966 days.

(21) Appl. No.: 11/373,970

(22) Filed: Mar. 14, 2006

(65) Prior Publication Data

US 2006/0212528 A1    Sep. 21, 2006

(30) Foreign Application Priority Data

Mar. 15, 2005   (JP)   ............... 2005-073958

(51) Int. Cl.
   *G06F 15/16* (2006.01)
   *G06F 17/00* (2006.01)
(52) U.S. Cl. ............................. 709/206; 715/277
(58) Field of Classification Search ............... 709/206, 709/207, 236, 247; 713/320, 323, 324, 300; 715/752, 251, 277; 379/93.24, 471, 473
   See application file for complete search history.

(56) References Cited

U.S. PATENT DOCUMENTS

| | | | | |
|---|---|---|---|---|
| 5,390,247 | A * | 2/1995 | Fischer | .............. 713/176 |
| 6,101,548 | A | 8/2000 | Okada | |
| 6,219,150 | B1 | 4/2001 | Eguchi | |
| 6,311,210 | B1 | 10/2001 | Foladare | |
| 6,493,105 | B1 | 12/2002 | Onuma | .............. 358/1.15 |
| 7,023,974 | B1 * | 4/2006 | Brannam et al. | ......... 379/93.24 |
| 7,111,046 | B2 | 9/2006 | Watanabe | |
| 2001/0040694 | A1 | 11/2001 | Eguchi | |
| 2003/0018731 | A1 * | 1/2003 | Watanabe et al. | ........... 709/207 |
| 2003/0189733 | A1 | 10/2003 | Kim | |
| 2003/0233421 | A1 | 12/2003 | Shibata | |
| 2005/0071500 | A1 | 3/2005 | Tonegawa | |
| 2005/0219076 | A1 * | 10/2005 | Harris | ........................ 341/51 |
| 2005/0225809 | A1 | 10/2005 | Tonegawa | |

(Continued)

FOREIGN PATENT DOCUMENTS

CN    1398476    2/2003

(Continued)

OTHER PUBLICATIONS

Korean Office Action dated Feb. 28, 2008 issued during prosecution of a Korean application No. 10-2006-0023880 corresponding to co-pending U.S. Appl. No. 11/365,595.

(Continued)

*Primary Examiner*—Wing F Chan
*Assistant Examiner*—Nam Thai
(74) *Attorney, Agent, or Firm*—Fitzpatrick, Cella, Harper & Scinto

(57) ABSTRACT

An improved e-mail communication apparatus, a data processing method and a program are provided. First, an MFP 100 which receives an e-mail decides whether or not the e-mail is one of a plurality of split data generated by dividing image data in data amount units and stores the e-mail. The MFP 100 then decides whether or not all the split data of the image data are stored, and when all the split data are stored, the MFP 100 generates combined data by combining the plurality of split data and performs printing processing on recording paper based on the combined data.

9 Claims, 15 Drawing Sheets

U.S. PATENT DOCUMENTS

| | | |
|---|---|---|
| 2006/0192990 A1 | 8/2006 | Tonegawa |
| 2006/0200529 A1 | 9/2006 | Tonegawa |
| 2006/0212527 A1 | 9/2006 | Tonegawa |
| 2006/0212528 A1 | 9/2006 | Tonegawa |
| 2008/0301234 A1 | 12/2008 | Tonegawa |

FOREIGN PATENT DOCUMENTS

| | | |
|---|---|---|
| CN | 1476230 | 2/2004 |
| JP | 2000-32202 | 1/2000 |
| JP | 2000-259513 | 9/2000 |
| JP | 2001-134505 | 5/2001 |
| JP | 2001-236275 | 8/2001 |
| JP | 2002-185686 | 6/2002 |
| JP | 2002-324035 | 11/2002 |
| JP | 2003-046702 | 2/2003 |
| JP | 2003-333098 | 11/2003 |
| JP | 2004-023121 | 1/2004 |
| JP | 2004-236005 | 8/2004 |
| JP | 2004236005 A * | 8/2004 |
| JP | 2004-252619 | 9/2004 |
| JP | 2004-280289 | 10/2004 |
| JP | 2004-312111 | 11/2004 |
| JP | 2005-057494 | 3/2005 |
| KR | 1998-087167 | 12/1998 |
| KR | 1998-087168 | 12/1998 |
| KR | 1999-007212 | 1/1999 |
| WO | 02/47337 | 6/2002 |

OTHER PUBLICATIONS

Chinese Office Action dated Apr. 4, 2008 issued during prosecution of corresponding Chinese Patent Application No. 200610064832.5.

U.S. Appl. No. 10/585,090, filed Jun. 30, 2006.

Korean Office Action dated Jun. 18, 2007, with its English language translation for Korean Patent Application No. 2006-23880 corresponding to co-pending U.S. Appl. No. 11/365,595.

N. Freed, et al., "Multipurpose Internet Mail Extensions (MIME) Part One: Format of Internet Message Bodies", Nov. 1996. http://ietf.org/rfc/rfc2045.txt.

N. Freed, et al., "Multipurpose Internet Mail Extensions (MIME) Part Two: Media Types", Nov. 1996. http://ietf.org/rfc/rfc2046.txt.

Masanori, Sasaki, "Anti-Practical Network Seminar", Linux Magazine, ASCII Corporation, vol. 7, No. 1, Feb. 1, 2005, pp. 133-139.

Fajman, R., "An Extensible Message Format for Message Dispositon Notifications", IETF, RFC2298, Mar. 1998. (cited in related U.S. Appl. No. 11/365,595 on Apr. 3, 2009).

* cited by examiner

FIG. 5

```
400  X-Priority: 1 (Highest)
401  Date: Wed, 31 Dec 2003 17:17:14 +0900
402  From: <ifax@copy1.xyz.co.jp>
403  Subject: ?ISO-2022-JP?B?WzEvNVObJEI7cU5BQXdJVRsoQg==?=
404  To: =?ISO-2022-JP?B?GyRCIUozdCFLGyhCQUJD?= <ifax@abc.co.jp>
405  Cc: =?ISO-2022-JP?B?GyRCMUQ2SBsoQjMbJEIyXRsoQg==?= <ifax@copy2.xyz.co.jp>,
406      =?ISO-2022-JP?B?GyRCMUQ2SBsoQjIbJEIyXRsoQg==?= <ifax@copy3.xyz.co.jp>
407  Bcc: =?ISO-2022-JP?B?GyRCMUQ2SBsoQjMbJEIyXRsoQg==?= <ifax@copy1.xyz.co.jp>
408  Message-Id: <20031231133647.TxNo.0580.01@copy3.xyz.co.jp>
409  Mime-Version: 1.0
410  Content-Type: message/partial; number=1; total=5;
411    id="20041110104508.0000.TxNo.0105@copy3.xyz.co.jp"
412
413  Priority: 1 (Highest)
414  Date: Wed, 31 Dec 2003 17:17:14 +0900
415  From: <ifax@copy1.xyz.co.jp>
416  Subject: =?ISO-2022-JP?B?GyRCO3FOQUF3SVUbKEI=?=
417  To: =?ISO-2022-JP?B?GyRCIUozdCFLGyhCQUJD?=<ifax@abc.co.jp>
418  Cc: =?ISO-2022-JP?B?GyRCMUQ2SBsoQjMbJEIyXRsoQg==?= <ifax@copy2.xyz.co.jp>,
419      =?ISO-2022-JP?B?GyRCMUQ2SBsoQjIbJEIyXRsoQg==?= <ifax@copy3.xyz.co.jp>
420  Bcc: =?ISO-2022-JP?B  GyRCMUQ2SBsoQjMbJEIyXRsoQg==?= <ifax@copy1.xyz.co.jp>
421  Message-Id: <20031231133647. TxNo. 0580.01@copy3.xyz.co.jp>
422  Mime-Version: 1.0
423  Content-Type: multipart/mixed; boundary ="AHMOALBJDADADADCDADAAAAOB "
424
425  --AHMOALBJDADADADCDADAAAAOB
426  Content-Type: text/plain; charset="ISO-2022-JP"
427
428   · $B$*@$OC$K$J$C$F$*$j$^$9!# · (B
429   · $B$40MMj$N;qNA$rAw$j$^$9!# · (B
430
431  --AHMOALBJDADADADCDADAAAAOB
432  Content-Type: image/tiff; name ="Image.tif"; application=faxbx
433  Conten-Transfer-Encoding: base64
434  Content-Disposition: attachment; filename="Image.tif"
435
436  SUkqAAgAAAARAP4ABAABAAAAAgAAAAABAwABAAAAwAYAAAEBAwABAAAAgAgAAAIBAwABAAAAQAA
437  AAMBAwABAAAAwAAAAYBAwABAAAAAAAAAoBAwABAAAAAgAAABEBBAABAAAA6gAAABIBAwABAAAA
438  AQAAABUBAwABAAAAQAAABYBBAABAAAAgAgAABcBBAABAAAAFlAAABoBBQABAAAA2gAAABsBBQAB
439    ...
440    ...
441    ...
442  eHlv+V8Uu/sOb4ri6KLe8wdXdfFlbntmEABonuluxl/nQPtBlt/ROCLqoiVRH3tzo1OUd8rHfueu
```

FIG. 10

DIVISION LIST
650 — DIVISION ID : 20041110104508.0000.TxNo.0105@copy3.xyz.co.jp
651 — OTHER PARTY : ifax@abc.co.jp

| | SUBJECT MATTER | DIVISION NUMBER | DATA SIZE | TIME OF RECEIPT |
|---|---|---|---|---|
| 1 | DELIVERY OF [1/5] DOCUMENT | 1/5 | 2.97 MByte | 2003/12/31 17:17 |
| 2 | DELIVERY OF [2/5] DOCUMENT | 2/5 | 2.97 MByte | 2003/12/31 17:17 |
| 3 | DELIVERY OF [5/5] DOCUMENT | 5/5 | 1.03 MByte | 2003/12/31 17:18 |
| 4 | | | | |
| 5 | | | | |
| 6 | | | | |

652   653   654   655

◁ 656
▷ 657

BACK — 658

660, 661, 662

F I G. 12
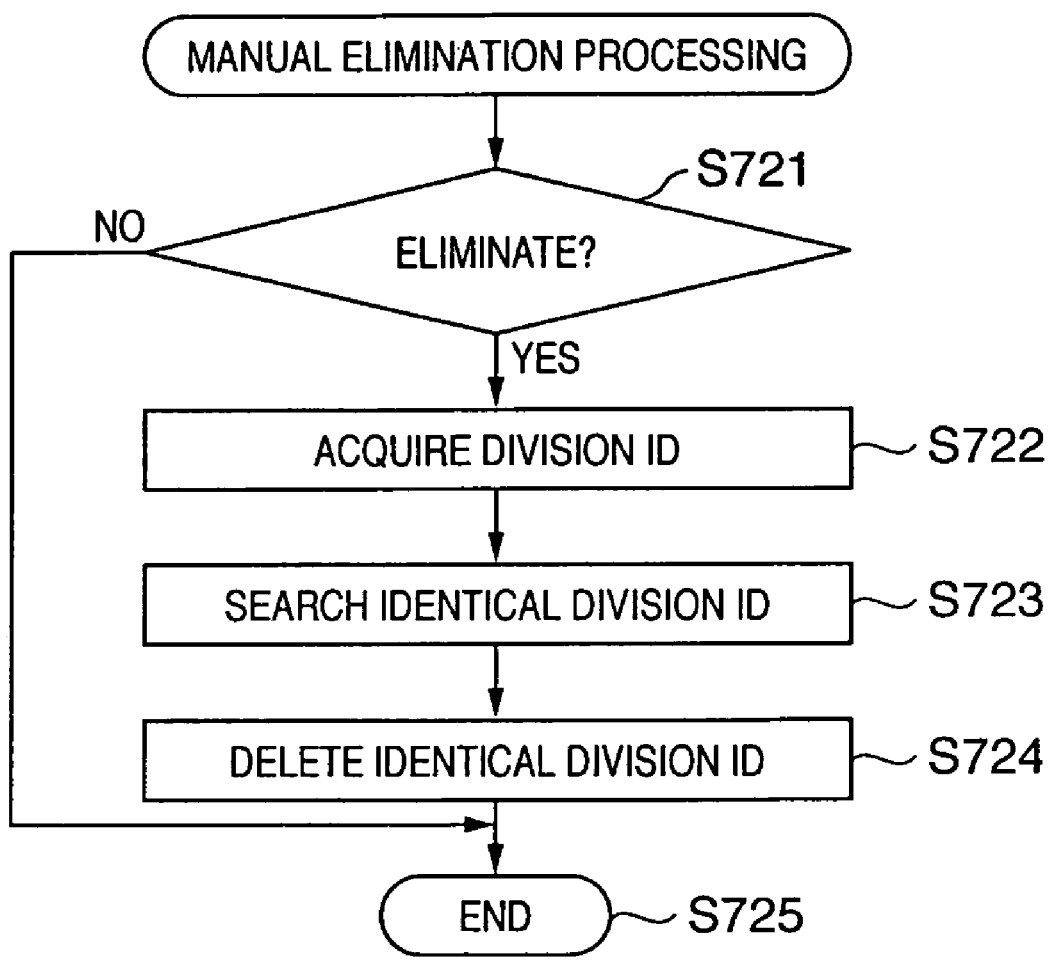

E-MAIL COMMUNICATION APPARATUS AND DATA PROCESSING METHOD AND PROGRAM

FIELD OF THE INVENTION

The present invention relates to an e-mail communication apparatus which receives electronic data transmitted attached to an e-mail and processes the electronic data, and a data processing method and a program.

BACKGROUND OF THE INVENTION

In recent years, e-mail which sends and receives character information through a network is becoming widespread with the spread of computers and increasing networking of information. E-mail allows files in various forms to be attached in addition to mail text which is character information. For example, Internet FAX (hereinafter, abbreviated as "IFAX") which sends and receives an image with a TIFF (Tag Image File Format) file attached as an attached file is becoming widespread.

IFAX is a technology for communicating among devices which can convert an image read using a scanner into a TIFF format, transmit it from a transmitter, reproduce the TIFF format image from the data received by the receiver and print the image.

When an e-mail is sent with a file of a big data size attached thereto here, the delivery of the e-mail is delayed because of a load on the processing by a mail server, and when the load is further aggravated, there may be even a case where the whole e-mail delivery service is stopped. Therefore, the mail server is generally often set so as not to receive any e-mail exceeding a predetermined data size. When an e-mail with an image of a big data size attached is sent to the mail server with such a setting from IFAX, delivery errors may occur in the mail server.

For example, when an e-mail is sent with an image attached thereto using a PC, it is comparatively easy to confirm the data size of the attached image. However, in case of IFAX, it is not until the image is scanned and transmitted that the data size of the image is known and it is difficult to predict the data size and there is a high possibility that the above described delivery errors may frequently occur. Therefore, there is a proposal of a technology about an Internet facsimile apparatus which divides image information corresponding to a plurality of pages in page units and transmits those pages (Japanese Patent Laid-Open No. 2000-32202).

Furthermore, there is a proposal of a technology which performs printing/transfer processing in page order of original image information when e-mail data transmitted with image information of a plurality of pages divided in page units is received (Japanese Patent Laid-Open No. 2004-236005). Moreover, MIME Content-Type defines a method of dividing one piece of e-mail data into a plurality of e-mails or combining a plurality of divided pieces of e-mail data into one using an identifier called "message/partial" (RFC 2045, RFC 2046).

Reception of e-mail obtained by dividing one piece of e-mail data into a plurality of e-mails (hereinafter, referred to as "split mail") has the following problem.

First, when data of a plurality of pages is divided in page units, each piece of data is attached to e-mail and transmitted, even if they are transmitted in order of page numbers, the data is passed through a mail server on the way, and therefore the order of page numbers is not guaranteed on the receiving side. Moreover, part of the e-mail to which a split page is attached may not reach the receiving side.

With regard to such a problem, Japanese Patent Laid-Open No. 2004-236005 discloses that when some of a plurality of split mails do not reach, the split mails are deleted when a predetermined time elapses after some split mails are received.

However, according to the method of waiting for a predetermined time to receive all split mails, if the predetermined time is too short, processing (printing processing, deletion processing and so on) of the split mails which have already been received may be carried out before receiving some split mails due to a delay in the processing by the server. On the other hand, if the predetermined time is too long, there is a problem that the processing of the split mails which have already been received may be delayed when some of the split mails do not reach.

Thus, instead of waiting for a predetermined time until all split mails are received, the processing of the split mails (printing processing, deletion processing and so on) may be performed through operation by an IFAX user (operator) who receives the split mails.

However, since, for example, some of the plurality of split mails are not received, when the split mails are deleted, it is complicated to perform processing (deletion or the like) on each of the plurality of split mails. For example, when the user is instructed to select split mails on an operation panel of IFAX and delete those mails, the user needs to select a plurality of split mails explicitly and delete them. Furthermore, according to the method described in Patent Document 2, a decision as to whether or not to delete split mails must be made for each split mail and the decision process produces a processing load.

SUMMARY OF THE INVENTION

The present invention has been implemented in view of such circumstances and it is an object of the present invention to provide an improved e-mail communication apparatus and a data processing method and a program.

It is another object of the present invention to provide an e-mail communication apparatus which receives split e-mails which are generated by dividing electronic data in specified unit and a data processing method and a program, capable of easily eliminating the plurality of split mails generated from electronic data in accordance with simple instruction (for example, one instruction to eliminate).

In order to solve the above described problems, the e-mail communication apparatus according to the present invention comprises receiving unit adapted to receive plurality of split e-mails which are generated by dividing electronic data in specified units, storing unit adapted to store the split e-mails received by the receiving unit, combining unit adapted to generate combined data by combining the 2 or more split e-mails stored in the storing unit, accepting unit adapted to accept an instruction by an user to eliminate split e-mails stored in the storing unit in a case where the storing unit doesn't store at least one of the split e-mails generated from the electronic data and eliminating unit adapted to eliminate 2 or more split e-mails which are generated from the electronic data and stored in the storing unit in accordance with the instruction accepted by the accepting unit.

Furthermore, to solve the above described problem, the data processing method according to the present invention comprises a receiving step of receiving a plurality of split e-mails which are generated by dividing electronic data in specified units, a storing step of storing the split e-mails in storing unit received by the receiving step, a combining step of generating combined data by combining the 2 or more split e-mails stored in the storing unit, an accepting step of accepting an instruction by an user to eliminate split e-mails stored in the storing unit in a case where the storing unit doesn't store at least one of the split e-mails generated from the electronic data, and an eliminating step of eliminating 2 or more split e-mails which are generated from the electronic data and stored in the storing unit in accordance with the instruction accepted by the accepting step.

Furthermore, in order to solve the above described problems, the program according to the present invention causes a computer to execute a receiving step of receiving a plurality of split e-mails which are generated by dividing electronic data in specified units, a storing step of storing the split e-mails in storing unit, a combining step of generating combined data by combining the 2 or more split e-mails stored in the storing unit, an accepting step of accepting an instruction by an user to eliminate split e-mails stored in the storing unit in a case where the storing unit doesn't store at least one of the split e-mails generated from the electronic data, and an eliminating step of eliminating 2 or more split e-mails which a are generated from the electronic data and stored in the storing unit in accordance with the instruction accepted by the accepting step.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 5 illustrates an example of split mail data which is transmitted in the condition of the transmission setting shown in FIG. 4;

FIG. 10 illustrates a screen which is displayed when the split mail 600 shown in FIG. 9 is selected and the split list button 620 is pushed;

FIG. 12 is a flow chart illustrating manual elimination processing steps which operate when the user pushes the elimination key 621 on the screen of FIG. 9;

DETAILED DESCRIPTION OF THE PREFERRED EMBODIMENTS

With reference now to the attached drawings, the configuration of a network system provided with an information processing apparatus according to an embodiment of the present invention and details of communication processing in the network system will be explained below.

First Embodiment

Figure 1:
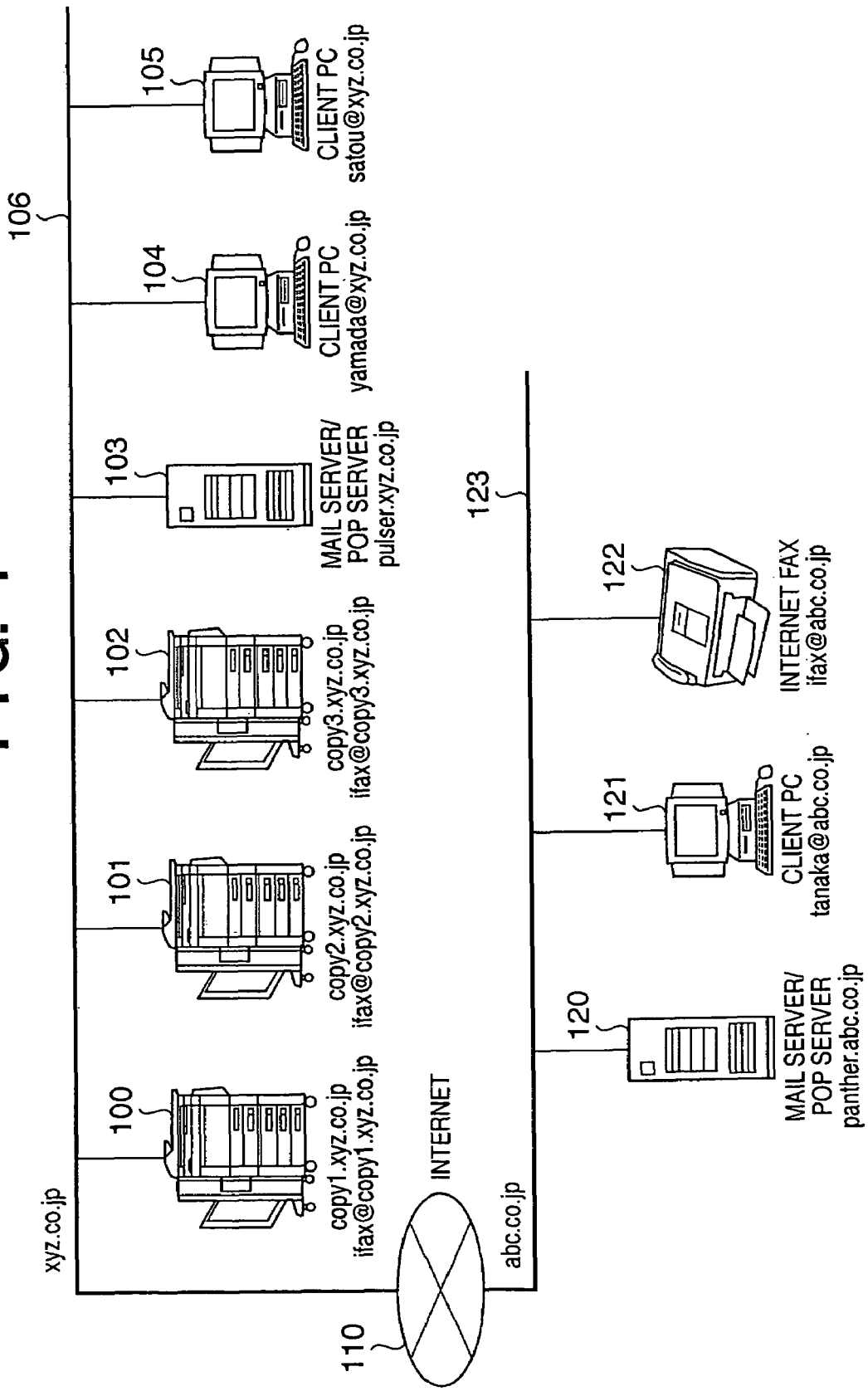
FIG. 1 is a configuration diagram of a network system in which various devices provided with an information processing apparatus according to a first embodiment of the present invention are connected through a network.

FIG. 1 is the configuration diagram of a network system in which various devices provided with an information processing apparatus according to a first embodiment of the present invention are connected through a network. As shown in FIG. 1, multi-function peripheral (MFP) devices 100, 101, 102 are provided with a scanner and a printer and so on and have a copy function and facsimile transmission/reception function. Furthermore, the MFPs 100, 101, 102 are also provided with a printer function which prints data created on a computer. The MFPs 100, 101, 102 are connected to a network 106 whose domain name is "xyz.co.jp." Furthermore, the MFPs 100, 101, 102 are connected to a plurality of computers such as a mail server/POP server 103 or client PC 104, 105 and various types of network devices. The information processing apparatus according to this embodiment is mounted on each of these MFPs 100, 101, 102, Mail server/POP server 103 and client PCs 104, 105.

Furthermore, the above described network 106 is connected to the Internet 110 which extends worldwide.

Moreover, the network 106 is also connected to a network 123 whose domain name is "abc.co.jp" to which a Mail server/POP server 120, client PC 121, Internet FAX 122 are connected. The information processing apparatus according to this embodiment is also mounted in each of these Mail server/POP server 120, client PC 121 and Internet FAX 122.

Furthermore, as shown in FIG. 1, the MFP 100 is given a host name called "copy1.xyz.co.jp" and e-mail mail address called "ifax@copy1.xyz.co.jp." On the other hand, the MFP 101 is given a host name called "copy2.xyz.co.jp" and e-mail mail address called "ifax@copy2.xyz.co.jp." Furthermore, the MFP 102 is given a host name called "copy3.xyz.co.jp" and e-mail mail address called "ifax@copy3.xyz.co.jp."

Furthermore, general-purpose e-mail software is installed in the client PC 104, which is assigned a mail address called "yamada@xyz.co.jp." Likewise, general-purpose electronic mail software is also installed in the client PC 105 and assigned a mail address called "satou@xyz.co.jp." Furthermore, the Mail server/POP server 103 has the functions of both the Mail server and the POP server.

On the other hand, general-purpose electronic mail software is installed in the client PC 121, which is assigned a mail address called "tanaka@abc.co.jp." General-purpose electronic mail software is also installed in the Internet FAX 122, which is assigned a mail address called "ifax@abc.co.jp." Furthermore, the Mail server/POP server 120 has the functions of both the Mail server and the POP server.

For example, in the system shown in FIG. 1, when the client PC 104 transmits an e-mail created using the electronic mail software to "tanaka@abc.co.jp", the system executes the following procedure. First, the client PC 104 requests the Mail server/POP server 103 to deliver the e-mail through an SMTP (Simple Mail Transfer Protocol) protocol. The Mail server/POP server 103 then delivers the e-mail data to the Mail server/POP server 120 through the SMTP protocol over the Internet 110. The e-mail is then stored in the mailbox of "tanaka@abc.co.jp" in the Mail server/POP server 120.

As described above, general-purpose electronic mail software is also installed in the client PC 121. The client PC 121 then monitors whether the e-mail has arrived at the mailbox of "tanaka@abc.co.jp" which exists in the Mail server/POP server 120 using the POP3 protocol at predetermined intervals. When the e-mail has arrived at the Mail server/POP server 120, the client PC 121 receives the e-mail. The POP3 protocol is an abbreviation of Post Office Protocol-Version 3.

On the contrary, when an e-mail is sent from "tanaka@abc.co.jp" of the client PC 121 to "yamada@xyz.co.jp" of the client PC 104, the system executes the following procedure. First, the client PC 121 requests the Mail server/POP server 120 to deliver the e-mail through the SMTP protocol. The Mail server/POP server 120 then delivers the e-mail to the Mail server/POP server 103. The e-mail is thereby stored in the mailbox of "yamada@xyz.co.jp" in the Mail server/POP server 103. The client PC 104 monitors whether the e-mail has arrived at the mailbox of "yamada@xyz.co.jp" which exists in the Mail server/POP server 103 using the POP3 protocol at predetermined intervals. When the e-mail has arrived at the Mail server/POP server 103, the client PC 104 receives the e-mail.

On the other hand, in FIG. 1, the MFPs 100, 101, 102 can execute an "e-mail transmission mode" in which image data is sent by a general-purpose e-mail. Furthermore, the MFPs 100, 101, 102 can execute an "IFAX transmission mode" presupposed to be sent to an apparatus which conforms to an IFAX standard.

The image data transmitted by the MFP 100, 101, 102 is image data as shown below, for example. There is, for example, image data received by the MFP 100, 101, 102 using a facsimile (FAX) function. There is also image data received by the MFP 100, 101, 102 using the Internet facsimile (IFAX) function. There is also image data read by the MFP 100, 101, 102 using a scanner.

The above described SMTP and POP3 are used for transmission/reception of e-mails by the MFPs 100, 101, 102 and perform operation similar to transmission/reception of e-mails by the above described client PC 104, client PC 121.

In an "Email transmission mode", when a color image is read using a scanner 134, the MFPs 100, 101, 102 can transmit image data of JPEG format or PDF (Portable Document Format). Furthermore, in the "Email transmission mode", when a black and white image is read by the scanner, the MFPs 100, 101, 102 can transmit image data of TIFF or PDF. When an e-mail is transmitted to the e-mail address of "yamada@xyz.co.jp" assigned to the client PC 104 from the MFP 100, 101 or 102, the client PC 104 receives the e-mail using the POP3 protocol. By so doing, the user who uses the client PC 104 can display the e-mail received using a general-purpose image viewer.

In these MFPs, in the "IFAX transmission mode", the image read by the scanner 134 is transmitted by the SMTP and POP3 protocols as the image data of a TIFF format which conforms to RFC 2301.

Also, the image data received using the scanner on the transmitting side, the FAX, IFAX reception functions for these MFPs is received by a receiver in a remote place and the received image is printed using a printer or the like in the remote place.

Figure 2:
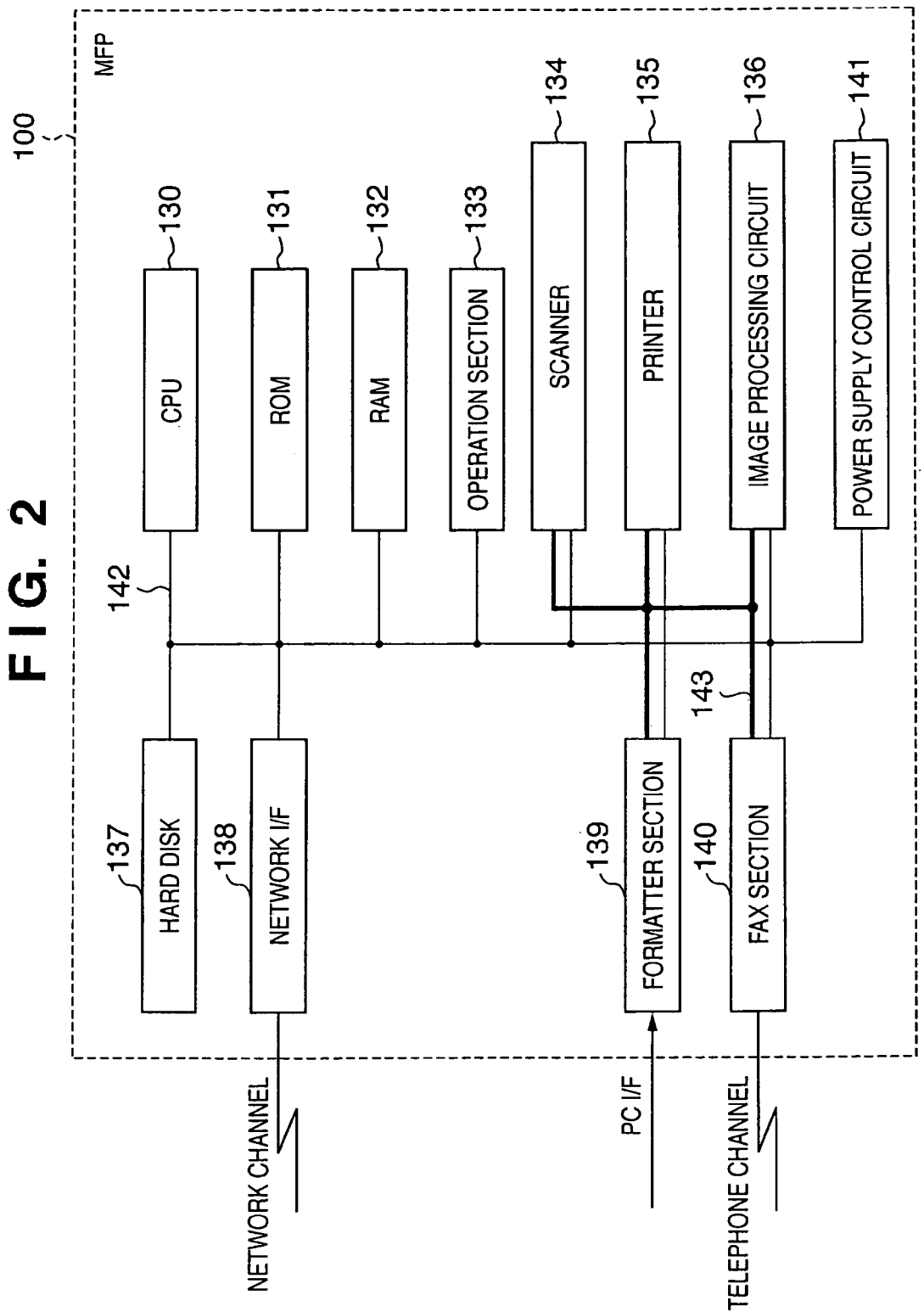
FIG. 2 is a block diagram showing the detailed configuration of the MFP 100 shown in FIG. 1.

FIG. 2 is a block diagram showing the detailed configuration of the MFP 100 shown in FIG. 1. Only the MFP 100 out of the MFPs shown in FIG. 1 will be explained below but other MFPs 101, 102 also have configurations similar to that of the MFP 100.

In FIG. 2, a CPU 130 is a control circuit which performs control over the whole system of the MFP 100 using a program stored in a ROM 131 and a temporary memory area of a RAM 132 which functions as memory.

Furthermore, an operation section 133 is made up of an LCD display panel and hard keys such as a start key and numeric keys. The operation section 133 is a unit which displays various buttons using a touch panel on the LCD and detects the position of a button the user touches with the finger to smoothly execute the user operation based thereon.

Figure 15:
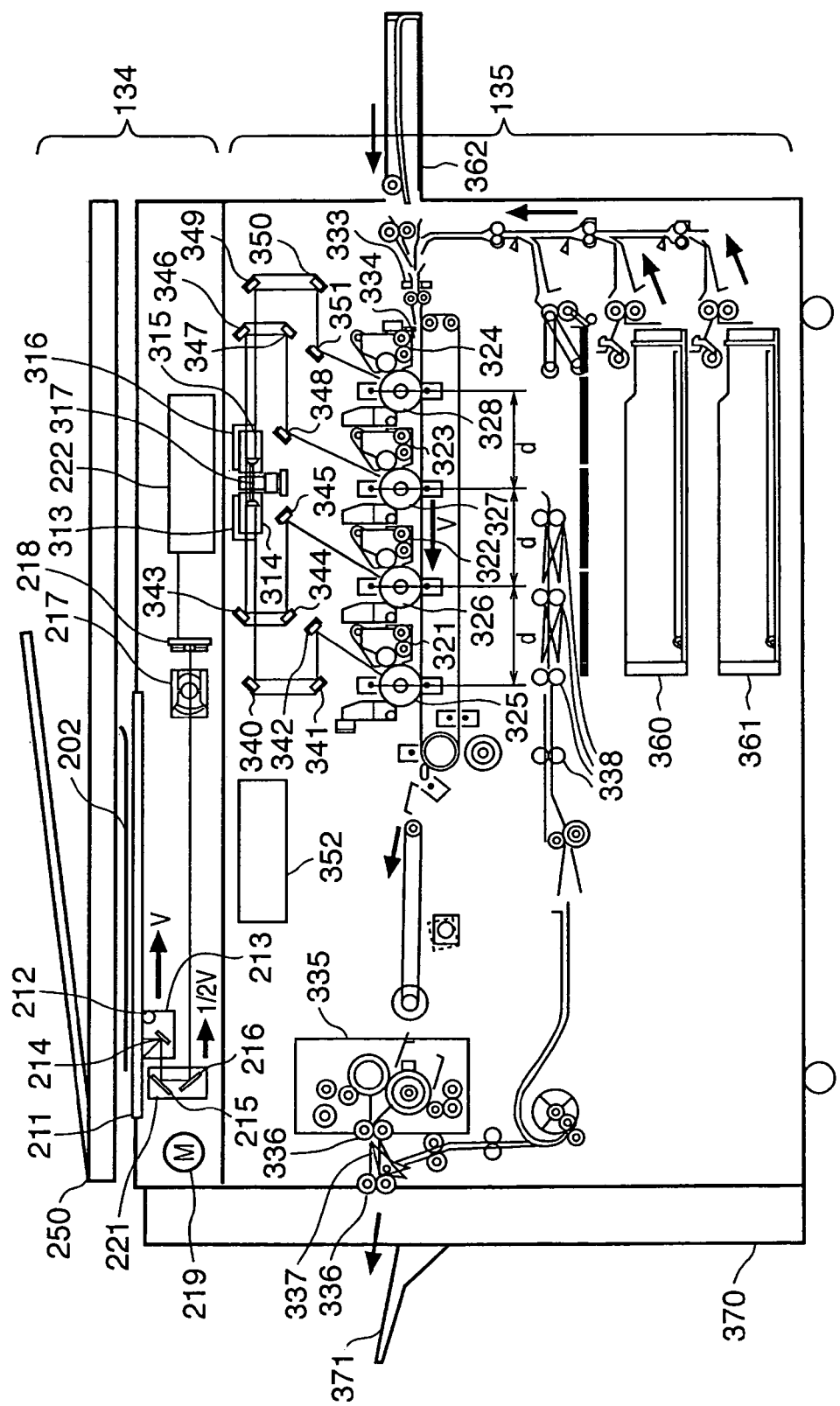
FIG. 15 is the configuration diagram of the scanner 134 and printer 135 of the MFP 100 shown in FIG. 1.

The scanner 134 is a unit which converts an image on a document into image data through a photoelectric conversion. FIG. 15 is the configuration diagram of the scanner 134 and printer 135 of the MFP 100 shown in FIG. 1. The scanner 134 transfers a document from a document feeder 250 onto a platen glass 211, and when the document is transferred onto the platen glass 211, the scanner 134 turns ON a lamp 212, starts the movement of a scanner unit 213 and scans the document by exposing it to light. The reflected light from the document is led to a CCD image sensor 218 through mirrors 214, 215, 216 and lens 217, converted to an electric signal and converted to digital data by an A/D conversion circuit. After the scanning operation of the document is completed, the document on the platen glass 211 is ejected.

On the other hand, the printer section 135 is a unit which prints electric image data to recording paper. The printer section 135 causes laser emission sections 313, 314, 315, 316 to emit laser light according to the electric image data, this laser light is irradiated onto photosensitive drums 325, 326, 327, 328 and latent images according to the laser light are formed on the photosensitive drums 325, 326, 327, 328. A developer is adhered to the latent images on the photosensitive drums 325, 326, 327, 328 by development apparatuses 321, 322, 323, 324. Furthermore, the printer 135 feeds recording paper from sheet feeding cassettes 360, 361, 362 at timings synchronized with the start of irradiation of the laser light and transfers it to a transfer section. Then, the printer 135 transfers the developer adhered to the photosensitive drums 325, 326, 327, 328 to the recording paper. The recording paper carrying the developer thereon is transferred to a fixing section 335 and the developer is fixed to the recording paper with the heat and pressure of the fixing section 335. The recording paper which has passed through the fixing section 335 is ejected by an ejection roller 336, and a sorter stores the ejected recording paper in respective bins sorting out the recording paper.

Furthermore, in FIG. 2, an image processing circuit 136 is made up of a large-volume image memory, image rotation circuit, resolution scaling circuit and coding/decoding circuits such as MH, MR, MMR, JBIG, JPEG. The image processing circuit 136 can execute various types of image processing such as shading, trimming, masking. Furthermore, a hard disk 137 is a large-volume recording medium connected by an interface such as SCSI, USB and can use other recording media of MO or the like in addition to the hard disk.

Moreover, in FIG. 2, a network I/F 138 is a circuit which executes a network data link to connect to networks channels such as Ethernet (registered trademark) represented by 10BASE-T, 100BASE-T or a token ring.

Furthermore, a formatter section 139 is provided with a PC I/F circuit of an IEEE1284-compliant parallel interface, USB or the like. The formatter section 139 creates image data from PDL (Page Description Language) data from the PC received through the PC I/F circuit or the network I/F circuit. The image processing circuit 136 performs image processing on the image data created by the formatter section 139 and generates print data for printing using the printer 135.

A FAX section 140 is a facsimile I/F circuit connected to a telephone line and made up of circuits such as NCU (Network Control Unit), MODEM (Modulator/DEModulator).

The MFP 100 performs image processing on the image data read by the scanner 134 through the image processing circuit 136 and can transmit the image data to other facsimile apparatuses via the telephone line. Furthermore, the MFP 100 receives image data transmitted from other facsimile apparatuses, performs image processing using the image processing circuit 136 and can print it using the printer 135.

The above described scanner 134, printer 135, image processing circuit 136, formatter section 139 and FAX section 140 are connected via a high-speed video bus 143 which is different from a CPU bus 142 from the CPU 130 and are constructed so as to transfer image data at high speed.

Furthermore, the MFP 100 performs image processing on the image data read by the scanner 134 through the image processing circuit 136, operates such that the read image is printed by the printer 135 and thereby realizes a copy function.

Moreover, the MFP 100 performs image processing on the image data read by the scanner 134 through the image processing circuit 136 and has a send function of transmitting the data onto the network from the network I/F. Furthermore, the MFP 100 creates image data in compliance with RFC 2301 through the image processing circuit 136 and has the IFAX function of transmitting/receiving data by e-mail.

Furthermore, in FIG. 2, a power supply control circuit 141 is a circuit which controls power consumed in the MFP 100 and lowers the temperature of the heater or the like or turns off the power to unused circuits, and can thereby reduce power consumption of the apparatus. The MFP 100 includes a "sleep 1 state" in which a power supply to the operation section 133 and the fixing temperature control circuit of the printer 135 is stopped by the power supply control circuit 141 and a "sleep 2 state" in which a power supply to most circuits including the CPU 130 is stopped.

The above described sleep 1 state has greater power consumption than the sleep 2 state, but when a start-up is instructed, the sleep 1 state starts more quickly than the sleep 2 state and becomes ready to be used. In the sleep 2 state, a power supply to the CPU 130 is also stopped, and therefore the software of the MFP 100 cannot be executed.

The CPU 130 starts up and is released from the sleep state 2 by a communication request from the network I/F 138, the external I/F such as the formatter section 139 and the FAX section 140 shown in FIG. 2 and holding down of a sleep key 411 which exists in the operation section 133 and which will be described later. The MFP 100 is changed to the sleep 1 state when the sleep 2 state is canceled. Furthermore, when an image is input to the printer 135 with communication data from the external I/F, the sleep 1 state is also canceled and changed to a standby state. After that, when the printing processing ends and a predetermined time elapses in the standby state, the state is shifted to the sleep 1 state. The state is shifted to the sleep 1 state also when the sleep key 411 is pushed. Furthermore, after a predetermined time has elapsed in the sleep 1 state, the sleep 2 state is set.

Figure 3:
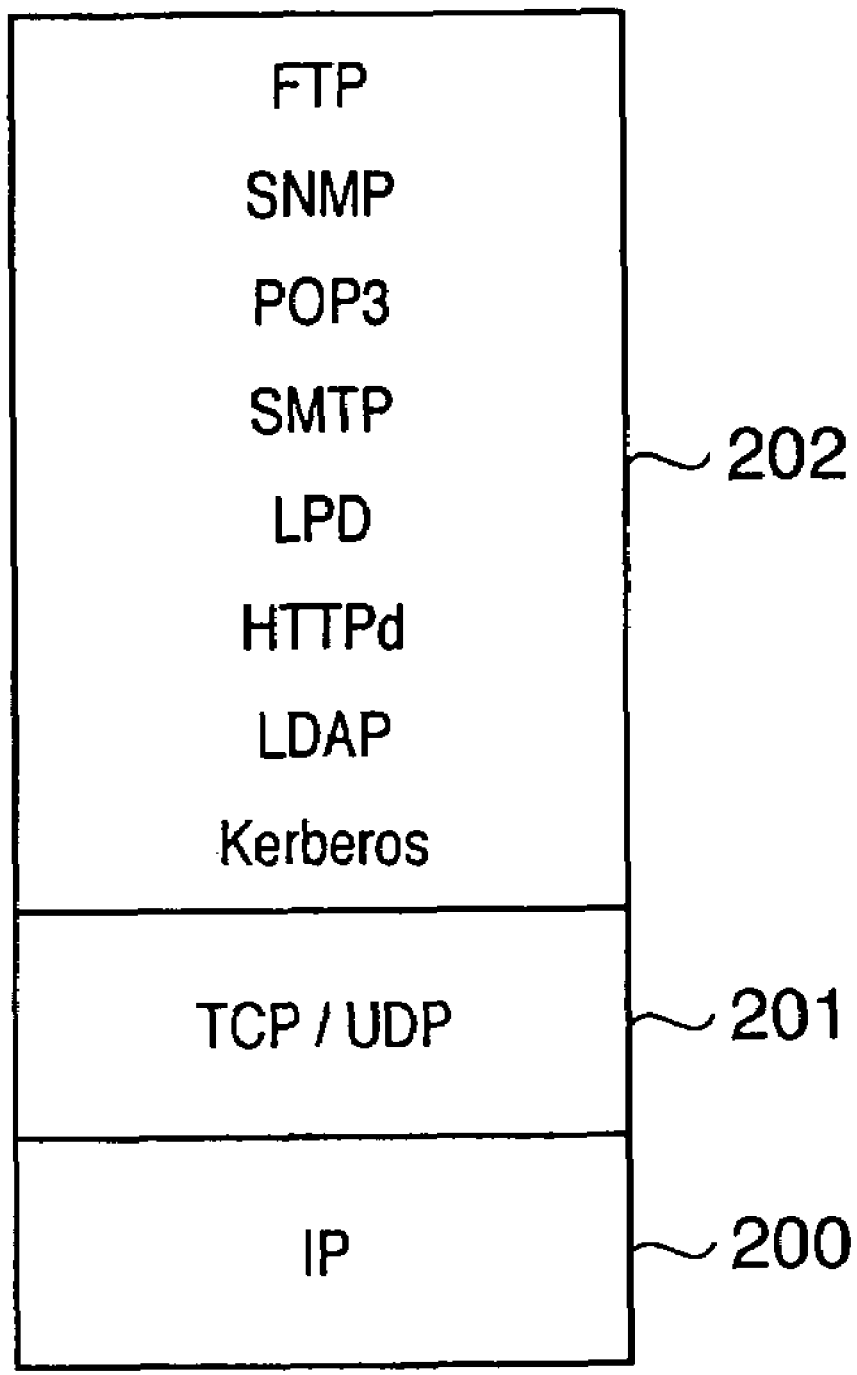
FIG. 3 illustrates the configuration of a network program owned by the MFP 100.

FIG. 3 illustrates the configuration of a network program executed by the MFP 100. As shown in FIG. 3, the configuration of the network program in the MFP 100 can roughly be divided into the following 3 layers of program. These programs are stored in the hard disks 137 or the like and are executed by the CPU 130.

IP (Internet protocol) 200
TCP (Transmission Control Protocol)/UDP (User Datagram Protocol) 201
Various types of protocol 202 of application layer First, the IP 200 is a protocol layer of the Internet which provides a service of sending a message while cooperating with relay nodes such as a router from the transmission host to the destination host. The IP 200 manages the address of a transmission destination to which data is transmitted and the address of the destination which receives data and executes the routing function of managing in what course the data is sent to the destination host over the network.

The TCP/UDP 201 is a transport layer which provides a service of sending a message from a transmission application process to a reception application process. TCP is a connection type service and guarantees high-level reliability of communication. On the other hand, UDP is a connectionless type service and does not guarantee reliability.

The various types of protocol 202 of the application layer define a plurality of protocols. These protocols include FTP (File Transfer Protocol) which is a file transfer service and SNMP which is a network management protocol. There is also, LPD which is a server protocol for printing by a printer and HTTPd which is a WWW (World Wide Web) server protocol. Moreover, there are e-mail transmission/reception protocol SMTP (Simple Mail Transfer Protocol), mail download protocol POP3 (Post Office Protocol-Version 3). Moreover, there is LDAP (Lightweight Directory Access Protocol) which is a protocol to access a directory database which manages the e-mail address of the user or the like. Also, a Kerberos authentication program which is specified in RFC 1510 is also provided.

Figure 4:
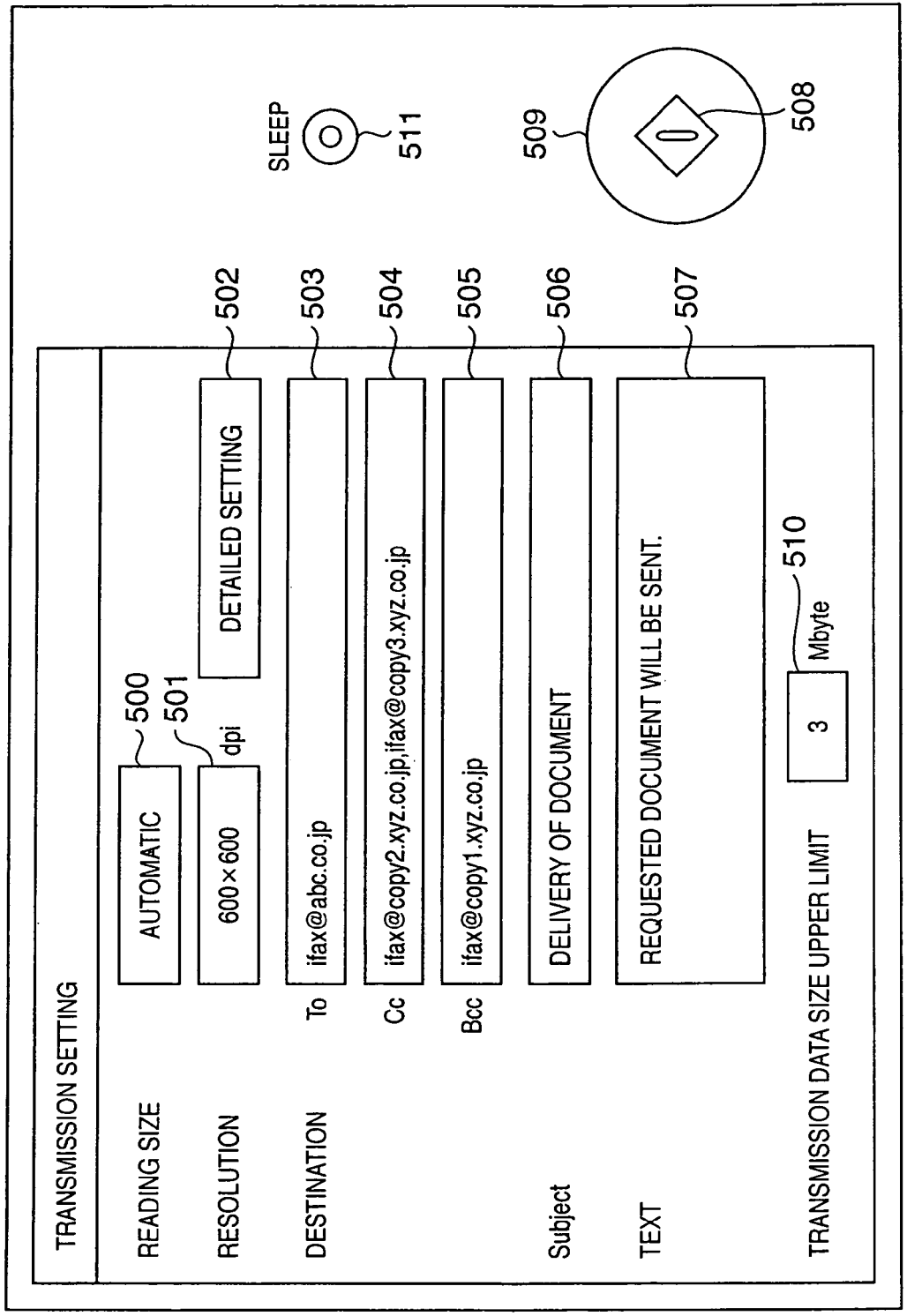
FIG. 4 illustrates an example of the transmission setting screen of the operation section 133 when image data read by the scanner 134 is transmitted by e-mail.

FIG. 4 shows an example of the transmission setting screen of the operation section 133 when image data read by the scanner 134 is transmitted by e-mail. The MFP 100 can specify the document size read by the scanner 134 as the reading size. For example, a size setting section 500 can specify the paper size such as A3, A4, A5, B4, B5, 11×17, LTR, STMT and the orientation of the paper. As shown in FIG. 4, "automatic" is currently set and the value detected by a document detection sensor which exists in the scanner 134 is read.

Also, a resolution setting section 501 can specify resolution when the scanner 134 reads an image from, for example, 200×100, 200×200, 200×400, 300×300, 400×400, 600×600 dpi. The default value of the resolution is, for example, 200× 200, and 600×600 dpi is currently set.

Moreover, a detailed setting section 502 can specify detailed operation during a scan such as the concentration setting during a scan, document type, reading of both sides and continuous copy of pages, image quality adjustment.

Furthermore, as shown in FIG. 4, in a To field 503 of the transmission destination of the e-mail, when selecting an address, it is possible to select from among addresses registered in an address book. Likewise, in a Cc field 504, when selecting an address, it is possible to select from among addresses registered in the address book. Moreover, in a Bcc field 505, when selecting an address, it is possible to select from among addresses registered in the address book. A maximum number of transmission destinations is, for example, 256, and therefore a total value of the number of the addresses selected in the To field 503, the number of the addresses selected in the Cc field 504 and the number of the addresses selected in the Bcc field 505 is limited to a maximum of 256.

Furthermore, in FIG. 4, a subject input section 506 and text input section 507 are the fields to enter the subject matter and mail text assigned to the respective e-mails to be transmitted respectively. For example, when each setting field is selected, the operation section 133 shows a soft keyboard which allows a character string to be entered.

Furthermore, in FIG. 4, a transmission data size upper limit setting section 510 is a section in which a maximum allowable size of e-mail data is set when transmitting an e-mail. E-mail data which exceeds a set data size is divided into a plurality of e-mails and transmitted as will be described later. That is, consequently, an e-mail having a data size greater than the limit value is not transmitted. When "0" is set as the limit value, the system may be operated such that the data size is considered unlimited and the e-mail is not divided.

The above described embodiment has explained the case where restrictions are placed on transmission according to the data size of an e-mail to be transmitted, but other methods can also be adopted. For example, it is also possible to place restrictions on the data size by converting to the image size of a TIFF file and JPEG file or the like to be transmitted.

Furthermore, it is possible to change the data size upper limit for every transmission operation by setting it on the transmission setting screen shown in FIG. 4 as described above, but when there is no need to change it for every transmission, the data size upper limit may be set as part of device information management. Furthermore, when the value of the upper limit is changed for each address, it is possible to set the upper limit for each address in the address book, for example.

Moreover, a start key 509 shown in FIG. 4 is a hard key installed next to the operation section 133 and when the user pushes this key, the scanner 134 is driven and image data read is transmitted as an e-mail. A blue and red LED 508 is set in the center of the start key 509. When no transmission address is specified, the red LED lights up informing the user that the scanner 134 cannot be driven even if the user pushes the start key 509. On the other hand, if at least one transmission address is specified, the blue LED lights up informing the user that the scanner is ready to be driven.

A sleep key 511 is a hard key and when this key is pressed in a standby state, the power supply control circuit 141 causes the system to shift to the above described sleep state and when this key is pressed in a sleep state, it is possible to restore the standby state.

Figure 8:
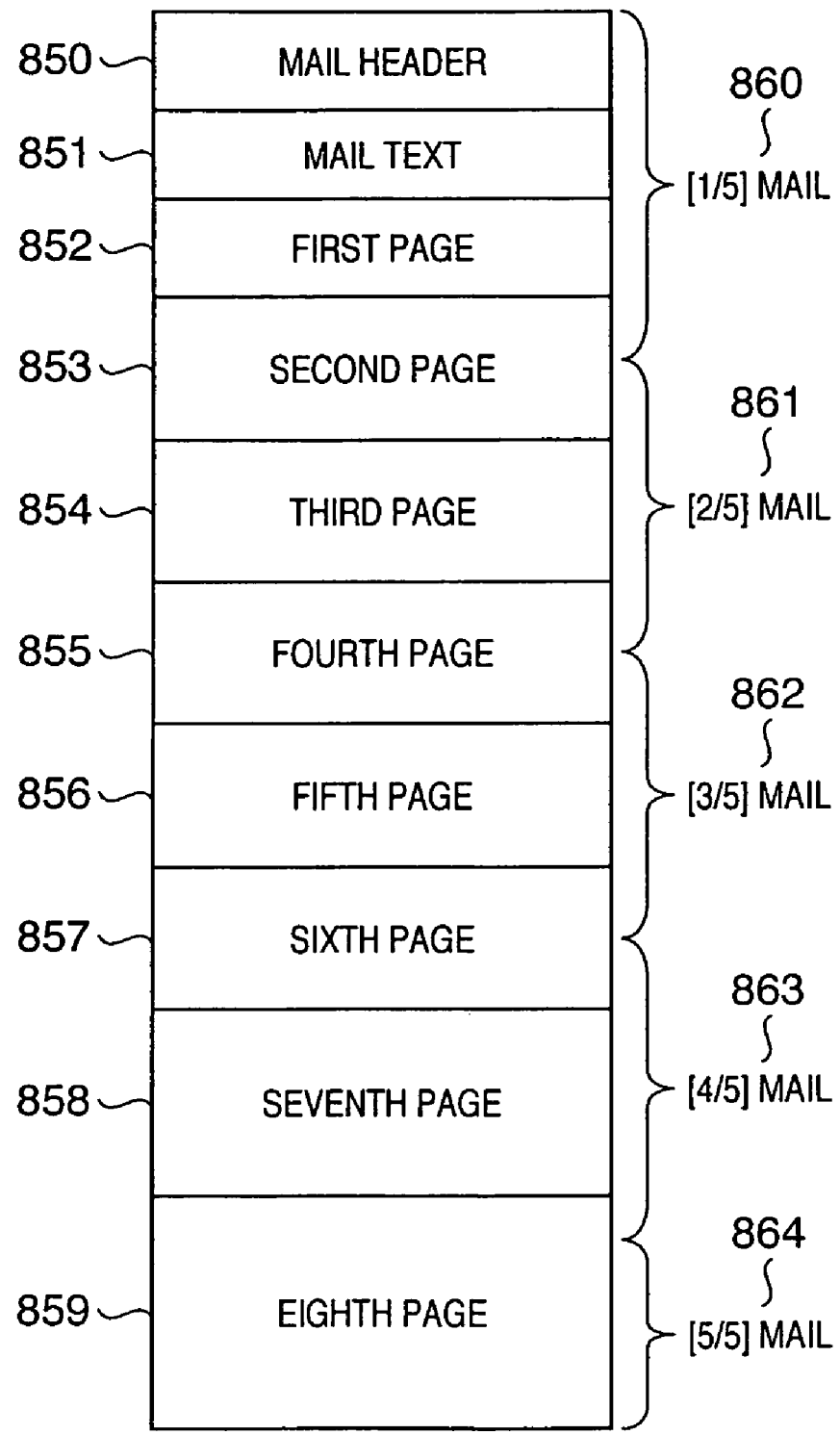
FIG. 8 illustrates is an e-mail to which an image file is attached divided into five split mails.

FIG. 8 shows an e-mail accompanied by an image file and divided into five split mails. As shown in FIG. 8, the e-mail data is made up of a mail header 850, mail text 851, first page image data 852, second page image data 853, third page image data 854, fourth page image data 855 and fifth page image data 856. As shown in FIG. 8, the e-mail is divided into five pieces and consists of split mail 860 of [1/5], split mail 861 of [2/5], split mail 862 of [3/5], split mail 863 of [4/5] and split mail 864 of [5/5].

When transmitting the above described split mails, a partial mail header like the mail header 850 that describes address information or the like is added at the start of each mail. Also, information such as a MIME identifier which shows that the e-mail is a split mail, division ID uniquely assigned to each split mail, division number and division total number is added.

FIG. 5 shows an example of split mail transmitted in the condition of the transmission setting shown in FIG. 4. In FIG. 5, the section from line number 400 to 411 corresponds to a mail header to deliver the split mail. "From" of line number 402 describes a mail address assigned to the MFP 100. Furthermore, "Subjects" of line number 403 is data which is a character string input to the Subject input section 506 converted into an encoded-word format defined in RFC 2047. Moreover, "To" of line number 404 is an address selected by the To field 503 and the Cc field 405 is an address selected in the Cc field 505. The Bcc field 407 is the data related to the address selected in the Bcc field 505 converted into the above described encoded-word format.

Furthermore, "Content-Type: message/partial;" of line number 410 indicates that this mail is a split mail and "number=1; Total=5" indicates that this is the first data of the mail divided into five pieces. Furthermore, "id=" 20041110104508.0000.TxNo.0105@copy3. xyz.co.jp" of line number 411 indicates a division id number of the split mail. The division id number is made up of date, time, transmission/reception number which is counted up every time a mail is sent and domain name of the transmitter. Mails having the same id number are regarded as split mails resulting from a division of the same mail.

Next, the data from line number 413 to 442 shows the real data of the split mail (that is, the first data of the mail divided into five pieces). First, the section from line number 413 to 422 is the mail header of the divided e-mail corresponding to the mail header 850. Then, "From" of line number 415, "To" of 417, "Cc" of 418, "Bcc" of 420 or the like are the same as "From" of above line number 402, "To" of 404, "Cc" of 405 and "Bcc" of 407.

Furthermore, Subject of line number 416 is "Subject" before being divided, and therefore it is the character string "delivery of document" input to the Subject input section 506 converted into an encoded-word format. On the other hand, "Subject" of line number 403 is "Subject" of the split mail, and therefore a character string "[1/5]" is added at the start of this character string which becomes data with the character string "delivery of [1/5] document" converted into an encoded-word format.

Moreover, line numbers 428, 429 are text data which is the text input to the text input section 507 converted into a JIOS code and corresponds to the mail text 851. This mail text is Japanese text data, and therefore data of "Content-Type: text/ Plain; charset="ISO-2022-JP"" is added to line number 426.

Furthermore, the data from line number 436 to 442 corresponds to the data 852 of up to the first page and is the data obtained by making the data read from the scanner an image file name Image.tif, converting it to a TIFF image file and subjecting this file to BASE64 encoding. Line numbers 432, 433, 434 describe that information. The data from the second page onward are assigned division numbers of 2, 3, 4, 5 and similar mails are generated and transmitted.

Mail data having the same id numbers are extracted and combined in order indicated by the numbers, and can thereby be combined as the mail data before being divided.

Figure 6:
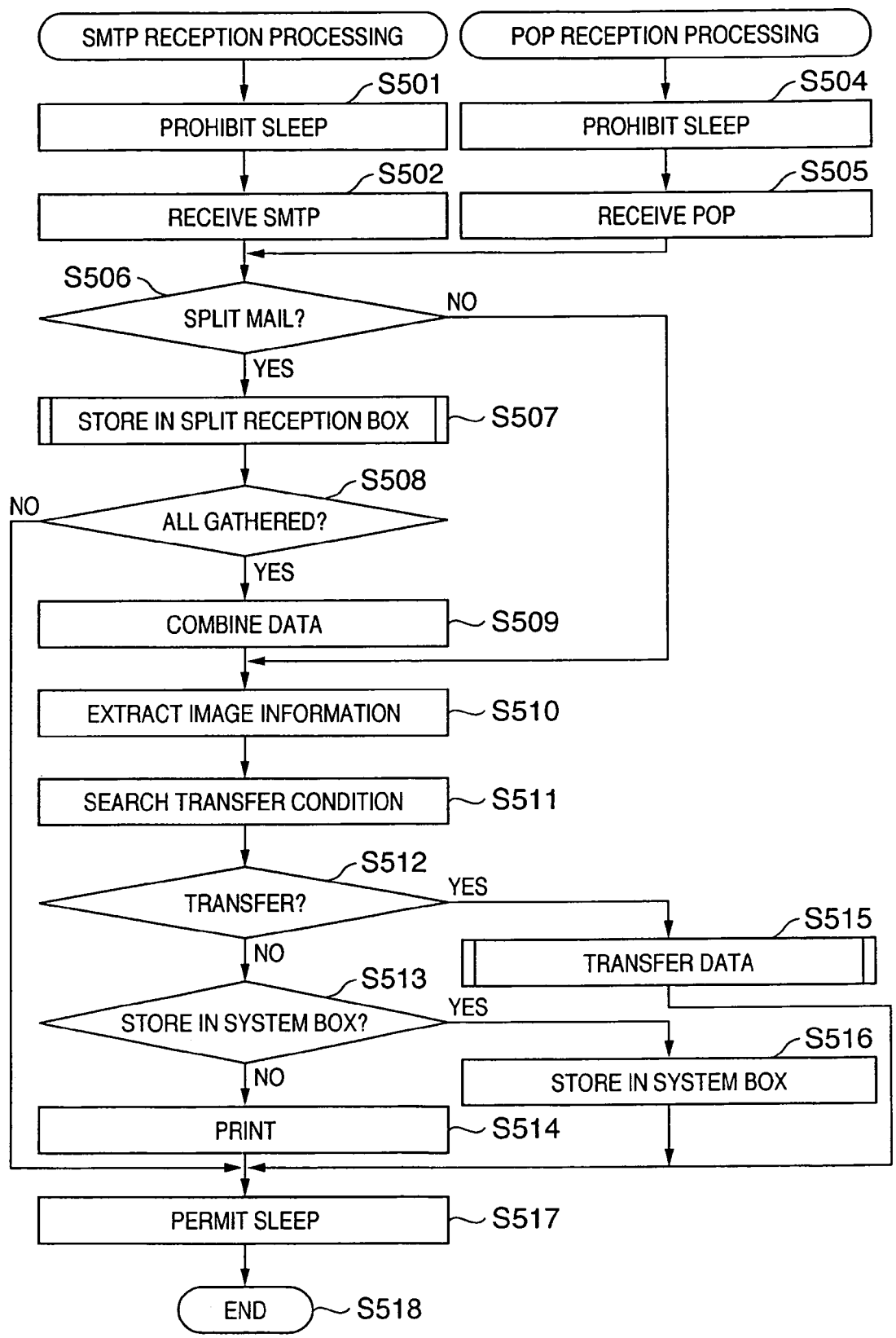
FIG. 6 is a flow chart illustrating processing steps such as reception, combination, printing or transfer of a split mail explained using FIG. 4 by the MFP 100 according to the first embodiment of the present invention.

FIG. 6 is a flow chart illustrating processing steps of reception, combination, printing or transfer of split mails by the MFP 100 according to the first embodiment of the present invention explained using FIG. 4. Suppose each step in FIG. 6 is executed by the CPU 130.

The MFP 100 starts SMTP reception processing by receiving an STMP request from the network I/F 138. Here, when the MFP 100 receives the SMTP request from the network I/F 138, if the MFP 100 is in a sleep 2 state, the MFP 100 starts the CPU 130 by an interrupt signal from the network I/F 138. The MFP 100 then cancels the sleep 2 state through the power supply control circuit 141 (step S501). That is, the SMTP request is an instruction which prohibits the CPU 130 from entering the sleep 2 state and as a result, the CPU 130 never enters a sleep state until sleep is permitted next. The MFP 100 receives e-mail data (SMTP reception) using an SMTP protocol (step S502).

On the other hand, in the processing of carrying out POP reception, a timer interrupt signal is input to the CPU 130 at predetermined intervals by a timer (not shown). By this interrupt signal, when the MFP 100 is in the sleep 2 state, the CPU 130 starts and the sleep 2 state is canceled by the power supply control circuit 141 (step S504). The processing in step S504 is the instruction which prohibits the CPU 130 from entering the sleep 2 state and as a result, the CPU 130 never enters a sleep state until sleep is permitted next. The MFP 100 then receives e-mail data which is accumulated in the Mail server/POP server (POP reception) using the POP3 protocol (step S505).

For the e-mail data received by the MFP 100 through SMTP reception (step S502) or POP reception (step S503), the MIME data is analyzed. Furthermore, the CPU 130 decides whether or not the e-mail is a mail of the message/partial format described in line number 410 of FIG. 5 (step S506). Then, when there is a description of message/partial, the CPU 130 decides that the e-mail is a split mail.

When the e-mail is decided to be a split mail in step S506 (Yes), the CPU 130 stores the split mail in the split reception box (step S507). On the other hand, when the CPU 130 decides that the e-mail is not a split mail (No), the CPU 130 moves to the processing in step S510.

When the split mail is stored in the split reception box in step S507, it is inspected whether or not all pieces of the split mails are gathered by being stored (step S508). As a result, when all split mails are not gathered (No), sleep is permitted (step S517) and the MFP 100 enters a sleep mode. When there is no problem even when the other circuits enter a sleep mode, the MFP 100 can also enter a sleep 2 state and power consumption in this case further becomes a small value.

On the other hand, when it is decided in step S508 that all pieces of the split mails are gathered (Yes), the MFP 100 extracts data from the respective split mails in the division number order. By combining the extracted data one by one and combining the data (step S509), the process moves to step S510.

In step S510, image information extraction processing is performed in the same way from the e-mail combined in step S509 or normal undivided received e-mail. In this embodiment, BASE64 or an already unencoded e-mail is decoded and converted to a TIFF file and image data is extracted from the converted TIFF file. Furthermore, when text data exists in the e-mail, the text information is rasterized and transformed into image data.

Furthermore, in the network system according to this embodiment, when the values of To, From, Subject of the received e-mail are predetermined values, there is a transfer function of transferring image data to their addresses (including system boxes, too). Thus, the transfer conditions for these data are searched and acquired (step S511). The acquired transfer information is compared with the values of the To, From, Subject fields described in the header field of the e-mail (step S512). As a result, when the values of the To, From, Subject fields match the transfer condition (Yes), data transfer processing is executed (step S515). On the other hand, in step S512, when the values of the To, From, Subject fields do not match the transfer conditions (No), it is decided whether or not the system box storage processing should be performed or not (step S513).

In step S513, when the transfer address is set to the system box or when printing cannot be performed for a reason that there is no printing paper in the printer 135 or the like, the system box storage is selected (Yes) and the system box storage processing is executed (step S516). After the system box storage processing is executed, the process moves to step S517. On the other hand, when storage in the system box is not performed (No), the printing processing of the image whose mail text is rasterized and the image extracted from the attached TIFF file is performed (step S514) and the process moves to the processing in step S517.

In step S517, the MFP 100 permits switchover to the standby state (i.e. sleep state) and ends the processing through the power supply control circuit 141. When the switchover to the sleep state is permitted, the power supply control circuit 141 enters a sleep state in the above described sleep 1 or sleep 2 state according to the temperature condition of the printer or other circuit conditions.

Figure 9:
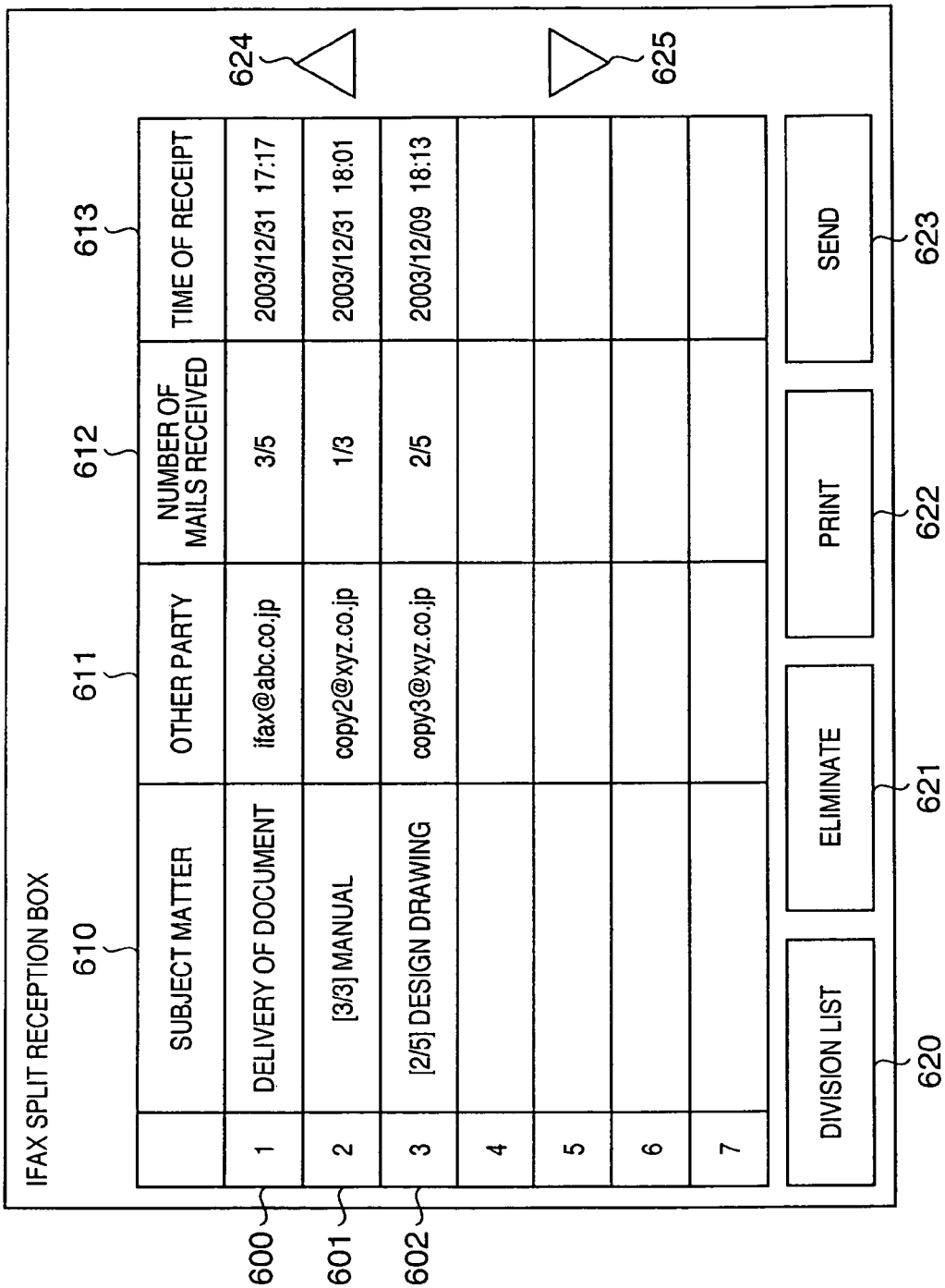
FIG. 9 illustrates a screen example of a split reception box which is displayed on the operation section 133 when split mails are accumulated temporarily.

FIG. 9 shows a screen example of the split reception box displayed on the operation section 133 when a split mail is temporarily accumulated. As shown in FIG. 9, three different pieces of split mails 600, 601, 602 are currently stored in the split reception box. In FIG. 9, a Subject matter 610 shows the subject matter of each received split mail and in the case of split mail shown in FIG. 5, Subject of line number 403 which shows the subject matter of split mail or Subject of line number 415 which is the subject matter of the mail before being divided are displayed.

Because the split mail 600 can receive the start mail of the divided mails, it displays Subject of line number 416 which is the subject matter of the split mail. On the other hand, the split mails 601, 602 cannot receive the start mail of the mails, and therefore it displays Subject of line number 403 which is the subject matter of each split mail.

In FIG. 9, the other communication party 611 shows the sender of the e-mail, and when the start mail of the split mails has been received successfully, the From information of line number 415 is assigned thereto and when the start mail of the split mails has not been received successfully, the value of the From information shown by line number 402 which is the From information of the split mail is assigned thereto.

Moreover, the number of mails received 612 shows the total number of mails having the same division ID and the number of mails that have been successfully received and, for example, the split mail 600 shows that the total number of mails is five and the number of e-mails which have been received successfully is three. Furthermore, a time of receipt 613 shows the time at which each split mail is received for the first time.

Furthermore, a split list button 620 is a button for executing a list display of a selected split mail, one at a time. Furthermore, an eliminate button 621 is a button for executing a deletion of the selected split mail, and can completely delete mails having the same identical division ID through a single operation. Moreover, a print button 622 and a send button 623 are buttons for printing and transmitting a combined e-mail after combining the selected split mails. Furthermore, arrow keys 624, 625 in FIG. 9 are keys for the operator to scroll the screen when it is not possible to display all mails at once because there are too many split mails to be displayed.

FIG. 10 shows the screen displayed when the split mail 600 shown in FIG. 9 is selected and the split list button 620 is pressed. FIG. 10 shows three mails of split mails 660, 661, 662. All mails in the list shown on the screen of FIG. 10 have the same division ID and a division ID 650 shows the value. The value shown as the division ID is created based on the data of line number 411 shown in FIG. 5.

In FIG. 10, the other communication party 651 has the same data as that of the other communication party 611 and indicates sender information of the e-mail. Furthermore, a subject matter 652 is Subject information on the split mail and is the Subject information of line number 403 in FIG. 5. Furthermore, a division number 653 is a division number of the split mail and is the value of number/total of line number 410. Except the last split mail, no entry of the total value is accepted, and therefore there may be a case where the total value is not entered.

Moreover, in FIG. 10, a data size 654 is a data size of each split mail and a time of receipt 655 is the time at which each split mail is received. Furthermore, a Return key 658 is a key for closing the screen which is shown in FIG. 10 and returning to the screen shown in FIG. 9, scroll keys 656, 657 are keys for the operator to scroll the screen when there are too many mails in the list to be displayed all at once.

Details of the split reception box storage processing (step S507) which is peculiar to this embodiment will be explained below.

Figure 11:
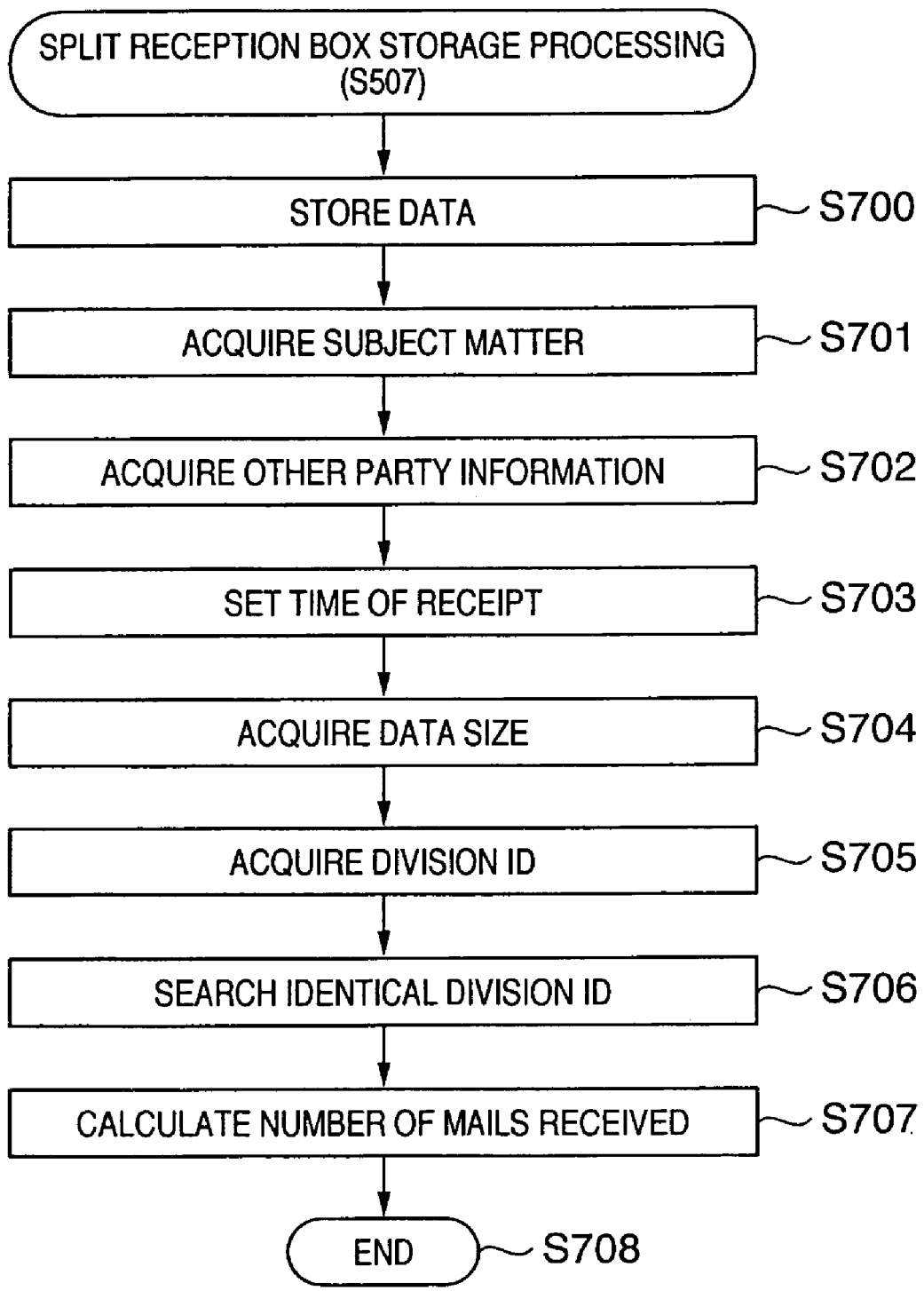
FIG. 11 is a flow chart illustrating details of the split reception box storage processing (step S507) according to a second embodiment.

FIG. 11 is a flow chart illustrating details of the split reception box storage processing (step S507) according to the first embodiment. First, received split mails are stored in a predetermined area of the hard disk 137 of the MFP 100 (step S700). Next, subject matter information of Subject of line number 403 of FIG. 5, Subject of line number 415 is acquired (step S701). The information acquired is used to display as subject matters 610, 652. Here, Subject of line number 416 is information which exists only at the start mail of the split mails and does not exist in the split mails except the start one. Therefore, when the start mail has been received successfully, Subject of line number 416 is used as the subject matter 610 and when the start mail has not been received successfully, Subject of line number 403 about the split mails which have been received successfully is used.

Next, the From information of line number 402 of the split mail and the From information of line number 414 are acquired (step S702) and displayed as the information of the other communication party 611 and the other communication party 651. Moreover, the time at which a split mail is received is acquired and the time of receipt is set (step S703) and the reception items are displayed in the time of receipt 613 and the time of receipt 655. This time of receipt will also be used by the processing of eliminating the split mails using a timer which will be described later.

Next, the data size of the split mail is calculated and acquired (step S704) and the value is displayed in data size 654. Moreover, information on the division ID of line number 411 is acquired (step S705) and the same division ID is searched (step S706). The split mails having the same acquired division ID are managed as the same split mails and are used for the combination processing and the elimination processing or the like. Furthermore, the acquired division ID is displayed in the division ID 650.

The number of split mails which have been considered to be identical split mails in step S706 (step S707) and used as the data of the numerator that the number of mails received 612. As the data of the denominator of the number of mails received 612, the total number of line number 410 is used and when the numerator and the denominator are identical, this means that all split mails have been received and gathered successfully.

According to RFC 2046, the above described total number need not always be described except the last split mail, and therefore the denominator of the number of mails received 612 may not be displayed. When the processing in step S707 ends, this split reception box storage processing ends.

FIG. 12 is a flow chart illustrating the manual elimination processing step which operates when the user pushes the eliminate key 621 on the screen of FIG. 9. When the user selects the split mails to be eliminated and further pushes the elimination key 621 on the screen of FIG. 9 with the split mails selected, a dialog questioning "are you sure to eliminate?" first and the execution of elimination of the split mails is confirmed (step S721). As a result, when the elimination is executed (Yes), the process moves to step S722 and when the elimination is not executed (No), this processing is finished.

The split mail 600 in FIG. 9 corresponds to the split mails including two or more split mails generated from the same electronic data (electronic data that corresponds to "DELIVERY OF DOCUMENT"). And, FIG. 9 shows the state that at least one (two split mails are shown in FIG. 9) of two or more split mails generated from electronic data that corresponds to "DELIVERY OF DOCUMENT" is not stored in the split reception box (for instance, storage area on RAM132).

In step S722, the division IDs of the selected split mails (for example, DELIVERY OF [1/5] DOCUMENT) is acquired and split mails which have identical division Ids (for example, DELIVERY OF [2/5] DOCUMENT and DELIVERY OF [5/5] DOCUMENT) are searched using the division ID acquired in step S722 (step S723). In addition to the selected split mail, the split mails having the identical division ID obtained by searching are also deleted (step S724). The split mails are also deleted from the division list through this deletion processing and this processing is finished.

"Selected split mail" in S722 corresponds to one of two or more split mails included in the split mails (either one of division mail 600-602) that the user of MFP100 (those who operate it) selected on the screen in FIG. 9. For instance, split mail 660 in FIG. 10 corresponds to "Selected split mail" in a case where split mails 600 is selected on the screen in FIG. 9.

For instance, it may be possible to install a new elimination key on the screen in FIG. 10. In this case, the user is made to press a new elimination key with one of split mails (660-662) is selected. In this case, the split mail selected on the screen in FIG. 10 corresponds to above-mentioned "Selected split mail".

Figure 13:
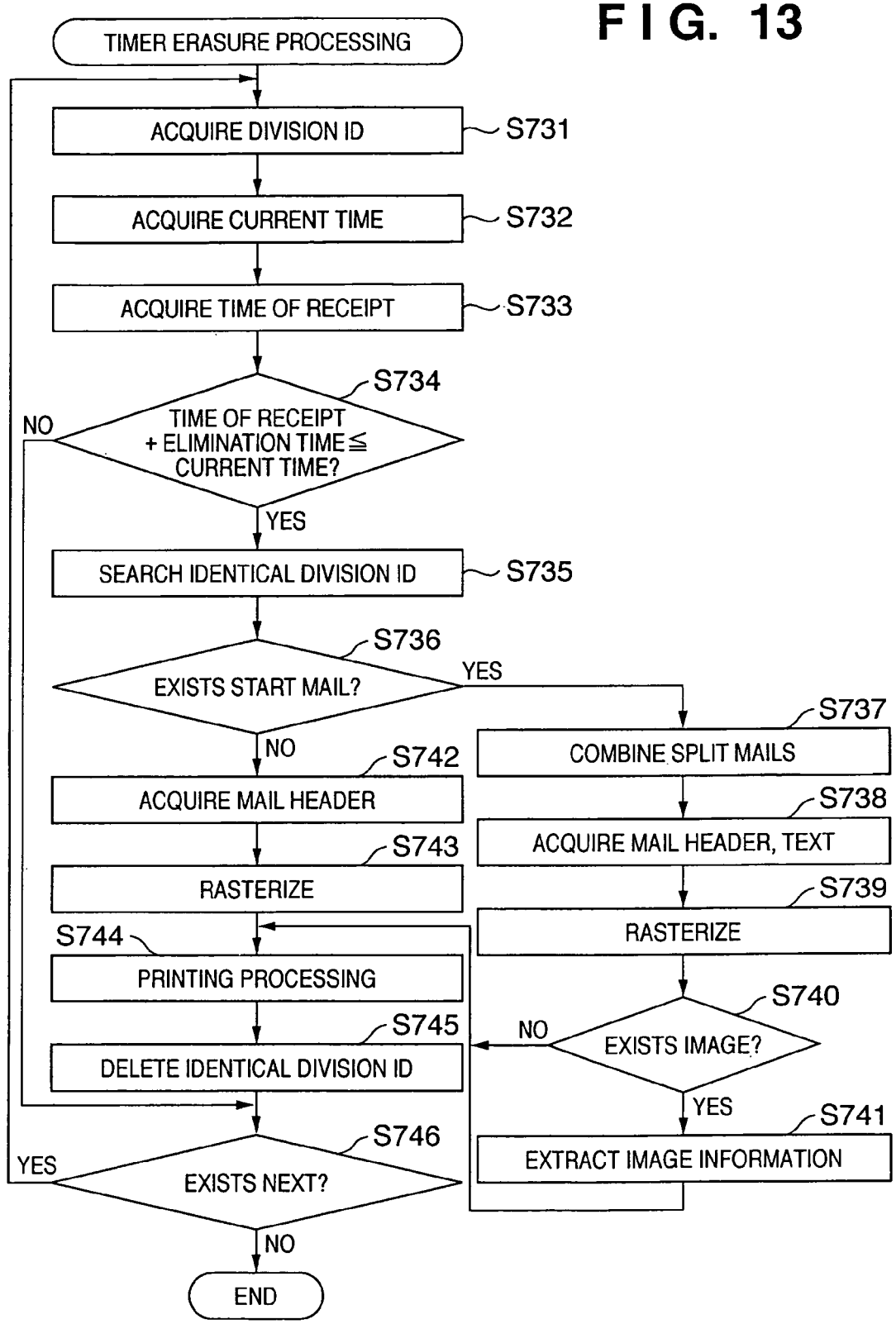
FIG. 13 is a flow chart illustrating the processing steps of eliminating split mails which have passed a predetermined time after receipt using a timer mounted on the MFP 100.

Next, the processing to solve the problem that the received split mails are not combined for a long period of time for some reason and left in the split reception box-semipermanently will be explained. FIG. 13 is a flowchart illustrating the processing steps of eliminating the split mails which have been left for a predetermined time after they are received using the timer which is set in the MFP 100.

When, for example, the split mails exist in the split reception box, the CPU 130 normally starts at intervals of 1 minute, but when the CPU 130 is in a sleep state as described above, operating the CPU 130 at intervals of 1 minute wastes power consumption. This embodiment allows the CPU 130 to be placed in a sleep state in such a case. When the CPU 130 is in such a sleep state, if the user pushes the sleep key 511 or the sleep state of the CPU 130 is canceled by a communication request from the network channel or the telephone line, the timer erasure processing which will be described later will operate.

In the timer erasure processing, the presence of the split mails in the split reception box exists is checked first and the division ID of the split mail is acquired (step S731). Next, the current time is acquired (step S732) and the time of receipt of the split mail set in step S703 in the flow chart of above described FIG. 11 is acquired (step S733).

From the user mode in which the setting information on the device is stored, it is decided whether the sum of the elimination time which means the time at which the split mails may be eliminated after a predetermined lapse of time after the reception and the time of receipt acquired in step S7833 is smaller than the current time acquired in step S732 or not (step S734). As a result, when the above described time is greater than the current time (Yes), the process moves to step S735 and when smaller (No), it is examined whether the next split mail exists or not (step S746), and when the next split mail exists (Yes), the process moves back to step S731 and when no next split mail exists, this processing is finished.

In step S735, a split mail having a division ID identical to the selected split mail is searched. On the split mail having a division ID identical to that of the division ID obtained through the search, it is examined whether the start mail of line number 410 whose number is 1 exists or not (step S736). As a result, when the start mail exists (Yes), the process moves to step S737.

On the other hand, when the start mail does not exist (No), mail header information which stores the sender information of the received split mails whose number is other than 1 is extracted and acquired (step S742), character string data is rasterized in the image using font data specified in the image data (step S743) and the process moves to printing processing (step S744).

Furthermore, in step S737, a plurality of split mails having an identical division ID are rearranged in order of the number of line number 410 and combined one by one from 1 up to an existing number. Through this processing, the mail data can be restored as shown in FIG. 5, but the part which has not been received cannot be restored. For example, when only [5/5] mail 864 has not arrived, mail text and the data from page 1 to page 7 can be combined. However, it is impossible to combine the image on page 8 which has not arrived.

Furthermore, when, for example, the data from [1/5] mail 860 to [3/5] mail 862 have been received successfully but [4/5] mail 863 has not been received successfully, the mail text and the image from page 1 to page 5 can be combined but the image from page 6 to page 8 cannot be combined.

Furthermore, when [1/5] mail 860 to [2/5] mail 861 have been received successfully but [3/5] mail 862 has not been received, the mail text and the image from page 1 to page 3 can be combined but the image from page 4 to page 8 cannot be combined.

Furthermore, when [1/5] mail 860 has been received successfully but [2/5] mail 861 has not been received successfully, the mail text and the image on page 1 can be combined but the image from page 2 to page 8 cannot be combined. Furthermore, when [1/5] mail 860 has not been received successfully, all information and image cannot be combined, but because the mail header information of [2/5] mail 861 to [5/5] mail 864 includes sender information, Subject, transmission time or the like, this information can be printed out. Therefore, there is such a merit that the sender can be identified and retransmission can also be requested.

As described above, after combining received split mails (step S737), the mail header corresponding to the section of the combined mail from line number 413 to 422, character string data of mail text of line numbers 427, 428 are acquired (step S738). The acquired character string data is rasterized on the image using font data specified in the acquired character string data (step S739).

Next, it is checked to evaluate whether or not the image data as shown on the first page 852 to the eighth page 859 in FIG. 8 exists (step S740), and if the image data exists (Yes), the process moves to step S741 and if the image data does not exist (No), the process moves to step S744.

In step S741, image information extraction processing is performed and the image data in which the data from the first page 852 to eighth page 859 in FIG. 8 is subjected to BASE64 encoding or the unencoded part is decoded and converted to a TIFF file. When the TIFF file created is of a multi-page format, it is converted to a TIFF file of a single page. In this case, halfway page data is deleted and the conversion processing is suspended.

Furthermore, even when the last halfway image data is cut at some midpoints of the page such as MH, the MR, MMR, but it is still held as one line of the image, it is possible to handle the part as image data and delete an image which is shorter than one line.

Next, the image data created is subjected to printing processing (step S744) and split mails having an identical division ID are deleted (step S745). Next, it is decided whether or not there are other split mails (step S746) and if it is decided that the next split mail exists (Yes), the process moves back to step S731 and when it is decided that there is no other split mail (No), this processing is finished.

Figure 14:
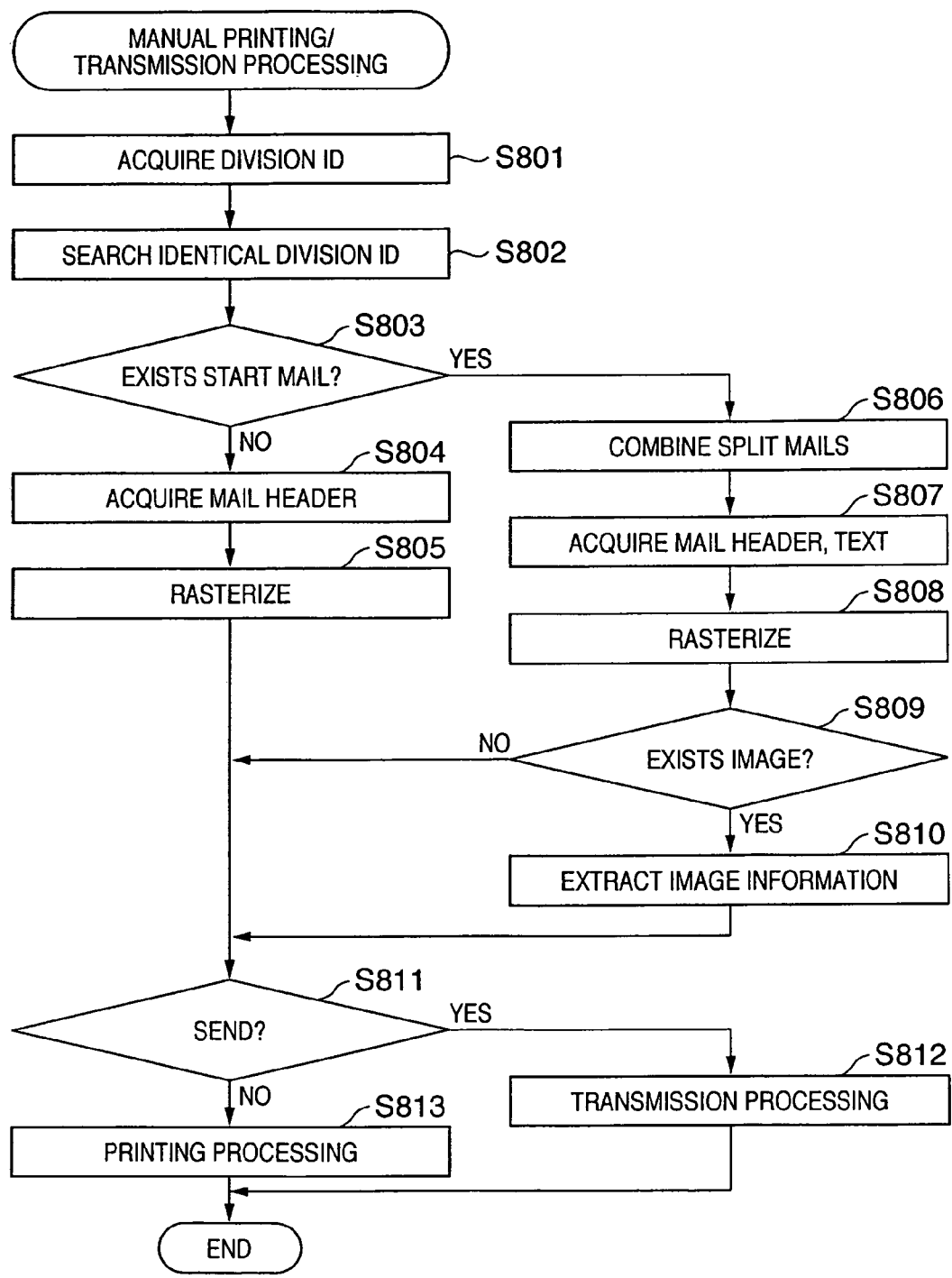
FIG. 14 is a flow chart illustrating operation when a print or transmission instruction is issued by the print button 622 in FIG. 9 or the Send button 623 in the condition in which all split mails have not arrived yet.

FIG. 14 is a flow chart illustrating operation when a print or transmission instruction is issued through the print button 622 or the send button 623 in FIG. 9 in a condition that all split mails are not gathered yet. When the print button 622 or the send button 623 is pushed, manual print/transmission processing which will be described later is executed.

First, the division IDs of selected split mails are acquired (step S801), all split mails stored in the split reception box are searched using the acquired division IDs and split mails having an identical division ID are picked up (step S802).

Next, it is examined whether the start mail when divided has arrived or not (step S803), and if the start mail has not arrived (No), images cannot be combined, and therefore the mail header of the split mail corresponding to the section from line number 400 to 411 in FIG. 8 is acquired (step S804), rasterize processing is carried out on this mail header information and converted to image data (step S805).

On the other hand, when it is decided in step S803 that the start mail exists (Yes), split mails are combined (step S806). In this case, when, for example, only [5/5] mail 864 has not arrived, it is impossible to combine the mail text and data from page 1 to page 7, but it is not possible to combine the image on page 8.

Furthermore, when [1/5] mail 860 to [3/5] mail 862 have been received successfully, but [4/5] mail 863 has not been received successfully, it is possible to combine the mail text and the image from page 1 to page 5. However, in this case, the image from page 6 to page 8 cannot be combined.

Furthermore, when [1/5] mail 860 to [2/5] mail 861 have been received successfully, but [3/5] mail 862 has not been received successfully, the mail text and the image from page 1 to page 3 can be combined, but the image from page 4 to page 8 cannot be combined.

Furthermore, when [1/5] mail 860 has been received successfully, but [2/5] mail 861 has not been received successfully, the mail text and the image on page 1 can be combined, but the image from page 2 to page 8 cannot be combined.

Next, in step S807, the mail header and text data of the mail text are acquired and when the data acquired is Japanese, JIS code is converted into SJIS code. Next, rasterize processing of converting text data to image data is performed (step S808).

Next, as a result of the combination processing, it is checked to evaluate whether the image data corresponding to first page 852 to 8th page 859 shown in FIG. 8 exists or not (step S809). As a result, when the image exists (Yes), image information extraction processing is performed (step S810) and mail data is subjected to BASE64 decoding or undecoding and converted to a TIFF file. In this case, when the TIFF file created is of a multi-page format, it is converted to a TIFF file of a single page and in this case, halfway page data is deleted and conversion processing is suspended.

Even when the last halfway image data is cut at some midpoints such as MH, the MR, MMR, if it holds as an image, it is possible to handle the part which holds as the image as 1-page image data without deleting the data. The created image data is subjected to processing in step S811.

In step S811, it is examined whether the send button 623 is pushed or the print button 622 is pushed. When the send button is pressed (Yes), the screen in FIG. 4 which specifies a transmission address is displayed and processing of transmitting an image to the specified address is performed (step S812). On the other hand, when the print button 622 is pushed (No), the created image is subjected to printing processing (step S813).

In the transmission processing in step S812, when the text information of mail text or the like is transmitted, it is possible to send text information to the address for which text information such as e-mail address can be handled instead of image data which is rasterized text information.

Furthermore, this embodiment has been explained using SMTP reception and POP reception as an e-mail reception method, but it is also possible to use a method of receiving e-mail using a protocol such as IMAP.

As explained above, according to the first embodiment, when the received mail is decided to be a split mail, the split mail is stored in a split reception box, it is examined whether all split mails are gathered or not when mails are stored in the box, and when all mails are not gathered, the user performs only a simple operation (for example, gives only one instruction) and can thereby process split mails.

Furthermore, according to the first embodiment, when the received mail is decided to be a split mail, the split mail is stored in the split reception box, the split mail identical to the split mail which has been left for a predetermined time is automatically deleted, and it is possible to thereby avoid system trouble caused by accumulation of split mails. Furthermore, it is also possible to delete split mails having an ID not identical to that of the deleted split mail. Furthermore, according to the first embodiment, the method to eliminate split mails in a case where the specified time has been passed after receipt of the split mail and the method to eliminate split mails in a case where the user input easy instruction (for instance, instruction of the elimination of split mails at the same time) can be used together.

Furthermore, according to the first embodiment, in a case where at least one of two or more split mails generated from the electronic data is not received, the printing or elimination of two or more split mails based on the user's elimination instruction can be appropriately executed.

Second Embodiment

Next, processing of a network system in which various types of device provided with an information processing apparatus according to a second embodiment of the present invention are connected through a network will be explained.

The configuration of the information processing apparatus and the network system and basic contents of processing carried out therein are similar to those of the foregoing first embodiment, and therefore explanations thereof will be omitted. Processing steps of reception, combination, printing or transfer by the MFP 100 according to the second embodiment are basically similar to those in the flow chart shown in FIG. 6 in the first embodiment.

Figure 7:
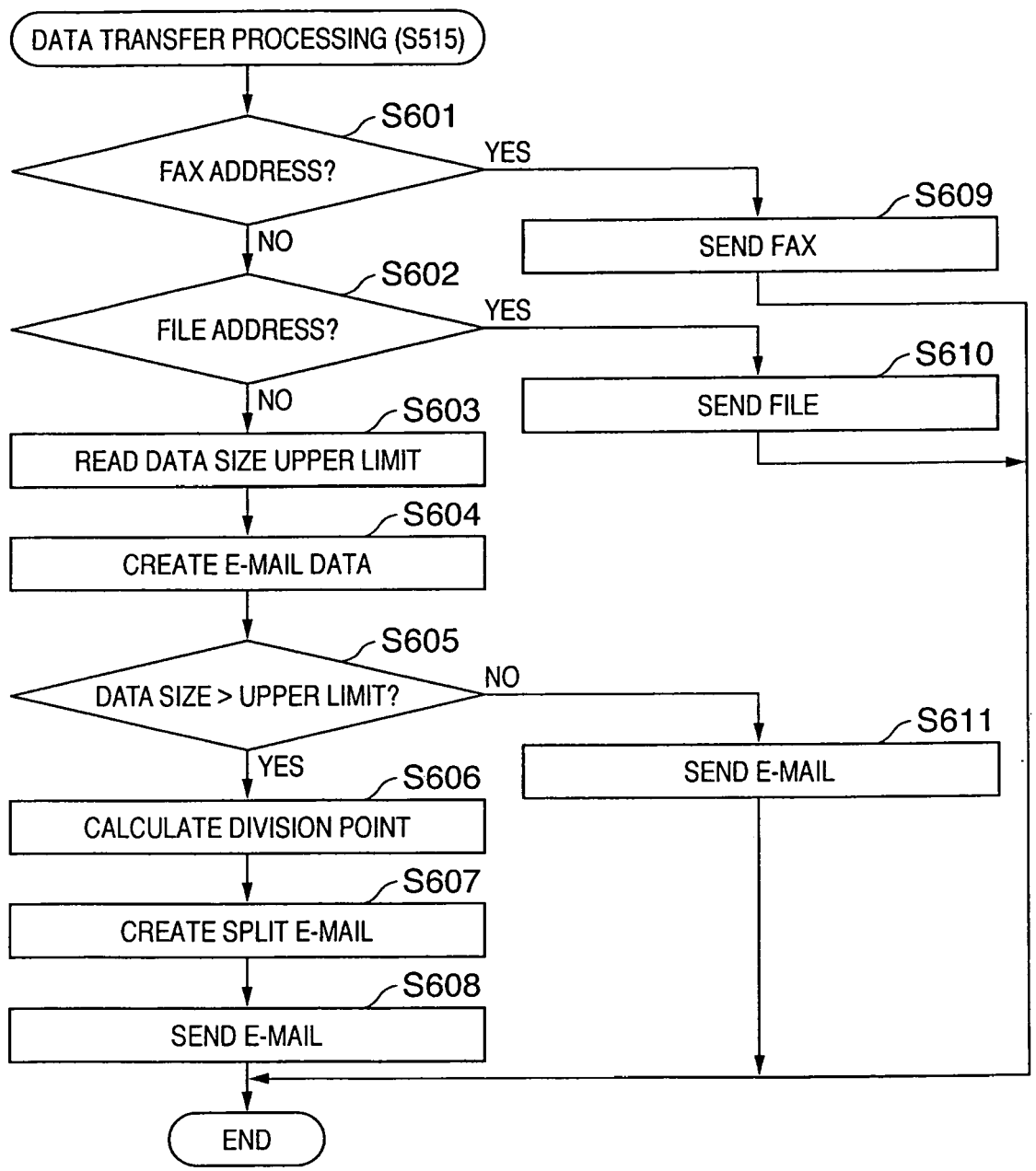
FIG. 7 is a flow chart illustrating details of the data transfer processing (step S515) in the flow chart shown in FIG. 6.

FIG. 7 is a flow chart illustrating details of the data transfer processing (step S515) in the flow chart shown in FIG. 6. As described above, when it is decided through the transfer condition search processing (step S511) that transfer conditions are matched (Yes in step S512), the data transfer processing (step S515) is executed.

First, it is examined whether or not the specified transfer destination is a FAX address (step S601). As a result, when the transfer destination is decided to be the FAX address (Yes), the circuit of the facsimile section 140 is operated, received image data is transmitted by facsimile (step S609) and the data transfer processing is finished (step S515).

On the other hand, when it is decided in step S601 that the specified transfer destination is not the FAX address (No), it is examined whether or not the specified transfer destination is the FILE address (step S602). As a result, when it is decided to be the FILE address (Yes), image data received from the network I/F section 138 using a communications protocol such as FTP, SMB is FILE-transmitted (step S610) and the data transfer processing is finished (step S515).

When the transmission destination is not the FILE address in step S602 (No), the transmission destination becomes the mail address or the IFAX address to which transmission is performed using an e-mail protocol. Therefore, in case of the destination for transmission using a mail protocol, the value of the upper limit of the data size set in the device information management is read in step S603. The upper limit of the data size may be set at the time of transfer setting regardless of device information management or may also be set for each address of the address book. Next, e-mail data is created from the received image data (step S604).

On the other hand, when the transmission destination is the IFAX address, the image header of the transmission destination is assigned and processing such as scaling, padding is performed using the image processing circuit 136 so as to obtain the image defined in RFC 2301. For these images, information such as resolution and number of pixels is written in the TIFF header and a TIFF file is created. Moreover, the TIFF file created is BASE-encoded and mail data is created with e-mail information of the transmission destination and MIME information assigned.

In step S605, a comparison is made to evaluate whether or not e-mail data created in step S604 is bigger than the data size upper limit read in step S603. As a result, when the e-mail data is smaller than the data size upper limit (No), the data created is transmitted by e-mail using an SMTP protocol (step S611). On the other hand, when the data size is bigger than the data size upper limit (Yes), a point of division is calculated (step S606), the created e-mail is divided and split mails are created (step S607). In this case, MIME information (message/partial) of an identifier indicating split data and mail header describing the transmission destination are assigned to the split data as explained using FIG. 5 and split mails are created.

Next, the plurality of split mails created in step S607 are transmitted using an SMTP protocol (step S608) and the data transfer processing is finished (step S515).

The above described embodiment has been explained using SMTP reception or POP reception as the e-mail reception method. In addition, it is also possible to use a method of receiving e-mail using a protocol such as IMAP. Furthermore, the embodiment has explained that the transfer destination is designed to match the transfer condition set in the MFP 100, but similar effects can also be obtained using a method of specifying the transfer destination in the received e-mail data and transferring to the specified address.

As described above, when the received mail is decided to be a split mail, this embodiment stores the split mail in the split reception box, inspects whether or not all split mails are gathered when mails are stored in the box, and when all mails are not gathered, this embodiment immediately finishes the reception processing and when all mails are gathered, this embodiment combines the split mails and performs printing processing and transfer processing just like a normal mail. In this way, it is possible to prevent processing from being stopped during reception and printing.

Furthermore, when the received mail is decided to be a split mail, this embodiment stores the split mail in the split reception box, inspects whether or not all split mails are gathered when they are stored in the box, and when all mails are not gathered, this embodiment places the CPU 130 in a sleep state and can thereby reduce power consumption of the device. Furthermore, when split mails are received and transferred using an e-mail protocol, this embodiment combines the split mails, creates a split mail within a split size range set in the device and transfers it. This can prevent transmission errors in a mail server on the way due to a large data size.

Other Embodiment

In the first embodiment, the split mails are selected, and one split mail included in the split mails (for instance, division mail 600) is selected in FIG. 7. However, it may be other forms. For instance, MFP100 selects the split mails, push elimination key 621, and acquire division ID given to the split mails. In this case, two or more split mails corresponding to division ID from which division ID given to the split mails is acquired, and acquired is deleted in bulk.

Furthermore in the first embodiment, it may be other forms though MFP100 eliminates all split mails corresponding to division ID acquired in step S722 among the division mail stored in the division reception box. For instance, MFP100 eliminates at least two split mails identical to division ID in bulk. The frequency of the elimination instruction can be decreased more than two or more split mail is deleted one by one by the user's (those who operate it) elimination instruction.

The embodiments have been explained in detail so far, but the present invention can assume embodiments as a system, apparatus, method, program or storage media (recording medium) or the like and more specifically, the present invention may be applied to a system made up of a plurality of devices and may also be applied to an apparatus which made up of a single device.

The present invention includes a case where a program (program which corresponds to the flow charts shown in the figures in the embodiments) of software to implement the functions of the above described embodiments is supplied to a system or apparatus directly or from a remote place, a computer of the system or apparatus reads the program code supplied and executes it.

Therefore, in order to realize the function and processing of the present invention using the computer, the program code itself installed in the computer is also intended to implement the present invention. That is, the present invention includes the computer program itself to realize the function and processing of the present invention.

In that case, it is possible to adopt various modes such as an object code, program executed by an interpreter, script data to be supplied to the OS and so on if these modes at least include the function of a program.

As a recording medium to supply the program, for example, a floppy (registered trademark) disk, a hard disk, optical disk, magneto-optic disk, MO, CD-ROM, CD-R, CD-RW, magnetic tape, non-volatile memory card, ROM, DVD (DVD-ROM, DVD-R), or the like can be used.

Besides, as the method of supplying a program, it is possible to supply the program by accessing a homepage on the Internet using a browser of a client computer and downloading the computer program itself of the present invention or a compressed file including an automatic installation function to a recording medium such as a hard disk. Furthermore, it is possible to realize the program by dividing the program code which constitutes the program of the present invention into a plurality of files and downloading the respective files from different homepages, too. In other words, a WWW server which allows the program file for implementing the function and processing of the present invention using the computer to be downloaded to a plurality of users is also included in the present invention.

Furthermore, it is also possible to encrypt the program of the present invention, store it in a storage medium such as CD-ROM, distribute it to users, allow those users who clear predetermined conditions to download key information to decrypt the encrypted program from the homepage via the Internet, use the key information, thereby execute the encrypted program, install the program in the computer and implement the program.

Furthermore, the computer executes the read program and realizes the functions of the aforementioned embodiments and the OS or the like which is operating on the computer based on the instructions of the program performs part or whole of the actual processing, and the functions of the above described embodiments can also be realized through the processing.

Furthermore, the program read from the recording medium is written in memory provided for a function extension board inserted in the computer or function extension unit connected to the computer, and then the CPU provided for the function extension board or function extension unit performs part or whole of the actual processing and the functions of the above described embodiments are also realized through the processing.

When a plurality of split mails are eliminated in a communication apparatus which receives a mail divided into a plurality of pieces, data processing method for the communication apparatus and a program, the present invention allows a plurality of mails divided from the same electronic data to be eliminated easily.

Furthermore, it is possible to receive a plurality of split mails safely and reduce power consumption of the device when split mails are received and combined. Moreover, even when a plurality of split mails are received, it is possible to combine them into an e-mail safely and perform printing and transfer processing.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-073958, filed on Mar. 15, 2005 which is hereby incorporated by reference herein in its entirety.

What is claimed is:

1. An e-mail communication apparatus comprising:
 a receiving unit constructed to receive plurality of split e-mails which are generated by dividing an e-mail to which an image file is attached in specified units;
 a storing unit constructed to store the split e-mails received by said receiving unit;
 a combining unit constructed to generate combined data including the split e-mails by combining the received split e-mails stored in said storing unit;
 an output unit constructed to output the combined data generated by said combining unit;
 a first accepting unit constructed to accept a first instruction input by a user to eliminate the received split e-mails stored in said storing unit in a case where said storing unit doesn't store at least one of the split e-mails generated from the e-mail;
 an eliminating unit constructed to eliminate 2 or more of the split e-mails which are generated from the e-mail and stored in said storing unit in accordance with the first instruction accepted by said first accepting unit;
 a second accepting unit constructed to accept a second instruction input by the user to combine the received split e-mails stored in said storing unit;
 a first control unit constructed to control, in response to the second instruction, said combining unit to generate the combined data by combining 2 or more of the received split e-mails including a leading split e-mail of the e-mail, and to control said output unit to output the combined data, in a case where the received split e-mails include the leading split e-mail of the e-mail; and
 a second control unit constructed to control, in response to the second instruction, said output unit not to output any of the split e-mails included among those received, when the received split e-mails do not include the leading split e-mail.

2. The apparatus according to claim 1, wherein
 said first accepting unit accepts the first instruction input by the user which selects one of the received split e-mails stored in said storing unit; and
 said eliminating unit eliminates the received split e-mail selected by the first instruction together with other received split e-mails generated from the same e-mail as the selected split e-mail stored in said storing unit.

3. The apparatus according to claim 2, wherein said eliminating unit eliminates all other received split e-mails stored in said storing unit that include identification information identical to identification information included in the received split e-mails selected by the first instruction.

4. The apparatus according to claim 1, further comprising a time of receipt storing unit for storing a time of receipt at which said receiving unit receives one of the split e-mails,
 wherein said eliminating unit eliminates one of the received split e-mails which has been left for a specified time from the time of receipt out of the split e-mails stored in said storing unit together with other split e-mails generated from the same e-mail related to the split e-mails.

5. The apparatus according to claim 4, wherein said eliminating unit eliminates all other split e-mails stored in said storing unit that include identification information identical to identification information included in the at least one of the split e-mails which has been left for the specified time from the time of receipt.

6. The apparatus according to claim 4, further comprising a power supply control unit constructed to shift to a sleep mode in which a function of a control circuit which controls said e-mail communication apparatus is stopped,
 wherein said power supply control unit continues the sleep mode in a case where the specified time has passed in the sleep mode, and
 said eliminating unit eliminates the split e-mail which has been left for the specified time and the other split e-mails in a case where said power supply control unit cancels the sleep mode.

7. The apparatus according to claim 1, wherein said output unit performs printing processing on a recording paper based on the combined data generated by said combining unit.

8. A data processing method for an e-mail communication apparatus, the method comprising:
 a receiving step of receiving plurality of split e-mails which are generated by dividing an e-mail to which an image file is attached in specified units;
 a storing step of storing the split e-mails received in the receiving step in a storing unit;
 a combining step of generating combined data including the split e-mails by combining the received split e-mails stored in said storing unit;
 an output step of outputting the combined data generated by said combining step;
 an accepting step of accepting a first instruction input by a user to eliminate the received split e-mails stored in said storing unit in a case where said storing unit doesn't store at least one of the split e-mails generated from the e-mail;
 an eliminating step of eliminating 2 or more of the split e-mails which are generated from the e-mail and stored in said storing unit in accordance with the first instruction accepted by said first receiving step;
 a second accepting step of accepting a second instruction input by the user to combine the received split e-mails stored in said storing unit;
 a first control step of controlling, in response to the second instruction, said combining step to generate the combined data by combining 2 or more of the received split e-mails including a leading split e-mail of the e-mail, and to control said output step to output the combined data, in a case where the received split e-mails include the leading split e-mail of the e-mail; and
 a second control step of controlling, in response to the second instruction, said output step not to output any of the split e-mails included among those received, when the received split e-mails do not include the leading split e-mail.

9. A computer-readable storage medium on which is stored a computer-executable program that, when executed, cause an e-mail communication apparatus to execute:
 a receiving step of receiving plurality of split e-mails which are generated by dividing an e-mail to which an image file is attached in specified units;
 a storing step of storing the split e-mails received by the receiving step in a storing unit;
 a combining step of generating combined data including the split e-mails by combining the received split e-mails stored in said storing unit;
 an output step of outputting the combined data generated by said combining step;
 a first accepting step of accepting a first instruction input by a user to eliminate the received split e-mails stored in said storing unit in a case where said storing unit doesn't store at least one of the split e-mails generated from the e-mail;

an eliminating step of eliminating 2 or more split e-mails which are generated from the e-mail and stored in said storing unit in accordance with the first instruction accepted by said first accepting step;

a second accepting step of accepting a second instruction input by the user to combine the received split e-mails stored in said storing unit;

a first control step of controlling, in response to the second instruction, said combining step to generate the combined data by combining 2 or more of the received split e-mails including a leading split e-mail of the e-mail, and to control said output step to output the combined data, in a case where the received split e-mails include the leading split e-mail of the e-mail; and a second control step of controlling, in response to the second instruction, said output step not to output any of the split e-mails included among those received when the received split e-mails do not include the leading split e-mail.

* * * * *